US010019640B2

(12) United States Patent
Almeida et al.

(10) Patent No.: US 10,019,640 B2
(45) Date of Patent: Jul. 10, 2018

(54) INTELLIGENT AUTOMATIC LICENSE PLATE RECOGNITION FOR ELECTRONIC TOLLING ENVIRONMENTS

(71) Applicant: Accenture Global Solutions Limited, Dublin (IE)

(72) Inventors: Ricardo André Santos Gomes de Almeida, Lisbon (PT); António Ricardo Ruano Pinto, Lisbon (PT); Romeu Rodrigues Figueira, Chicago, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 15/254,859

(22) Filed: Sep. 1, 2016

(65) Prior Publication Data

US 2017/0372161 A1 Dec. 28, 2017

(30) Foreign Application Priority Data

Jun. 24, 2016 (PT) ........................................ 109486

(51) Int. Cl.
*G06K 9/00* (2006.01)
*G06K 9/32* (2006.01)
*G07C 9/00* (2006.01)

(52) U.S. Cl.
CPC ....... *G06K 9/3258* (2013.01); *G07C 9/00007* (2013.01); *G06K 2209/01* (2013.01); *G06K 2209/15* (2013.01)

(58) Field of Classification Search
CPC .. G06K 2209/15; G06K 9/325; G06K 9/3258; G07B 15/063; G06Q 50/30
(Continued)

(56) References Cited

U.S. PATENT DOCUMENTS 8,274,377 B2 * 9/2012 Smith .................... G08B 21/10
340/286.02
9,384,423 B2 * 7/2016 Rodriguez-Serrano .. G06K 9/72
(Continued)

FOREIGN PATENT DOCUMENTS

EP 3261022 12/2017

OTHER PUBLICATIONS

Anonymous, "Confidence Interval—Wikipedia" dated Jun. 18, 2016, Retrieved from the Internet: URL: https://en.wikipedia.org/w/indix.php?title=Confidence_interval&oldid=725881099 retrieved on Jul. 7, 2017, p. 7, 17 pages.
(Continued)

*Primary Examiner* — Charlotte M Baker
(74) *Attorney, Agent, or Firm* — Brinks Gilson & Lione

(57) ABSTRACT

An intelligent automatic license plate recognition (IALPR) system implements technical solutions that improve the accuracy of automatic license plate recognition. The IALPR analyzes an image of a vehicle proximate to a toll collection point using optical character recognition (OCR), and determines candidate license plate identifications based, at least in part, on the corresponding OCR confidence level. The IALPR can also perform fingerprinting for candidate license plate images and matching analysis with a knowledge base, resulting in additional confidence levels. The IALPR can also perform behavioral analysis on the candidate license plate identifications, including trip context analysis, historical behavioral analysis, or other analytics. The IALPR can generate an overall confidence level for the candidate license plate identifications responsive to the OCR and vehicle fingerprint confidence levels and the behavioral analysis. This enhanced analysis helps the IALPR reduce the number of incorrect license plate identifications and reduce the need for human review.

19 Claims, 12 Drawing Sheets

(58) Field of Classification Search
USPC ........ 382/105; 340/286.02, 506, 507; 700/3, 700/82
See application file for complete search history.

(56) References Cited

U.S. PATENT DOCUMENTS

| | | |
|---|---|---|
| 2002/0140577 A1 | 10/2002 | Kavner |
| 2006/0278705 A1 | 12/2006 | Hedley et al. |
| 2012/0155712 A1 | 6/2012 | Paul et al. |
| 2013/0132166 A1 | 5/2013 | Wu et al. |

OTHER PUBLICATIONS

Australian Patent Office, Second Examination Report for Australian Patent Application No. 2016244237 dated Mar. 16, 2017, 2 pages.
Australian Patent Office, Third Examination Report for Australian Patent Application No. 2016244237 dated Jul. 21, 2017, 4 pages.
European Patent Office, Extended European Search Report for European Patent Application No. 16193865.9 dated Jul. 18, 2017, 20 pages.
Oliveira-Neto et al., "Online license plate matching procedures using license-plate recognition machines and new weighted edit distance", Transportation Research. Part C, Emerging Technologies, Pergamon, New York, NY, GB, vol. 21, No. 1, dated Nov. 14, 2011, pp. 306-320.
Jaeger et al., "Identifying Script on Word-Level with Informational Confidence" Eights International Proceedings on Document Analysis and Recognition, IEEE, dated Aug. 31, 2005, pp. 416-420.
Li et al., "Markov random field models in computer vision", dated May 2, 1994, Network and Parallel Computing; Lect. Notes Computer, Springer International Publishing, Cham, pp. 361-370.
Steorts, "Some of Bayesian Statistics: The Essential Parts Contents", dated Feb. 21, 2016, Retrieved from the Internet: URL: www2.stat.duke.edu/rcs46/books/bayes_manuscripts.pdf.
Patent Examination Report No. 1 corresponding to Australian Patent Application No. 2016244237, dated Nov. 17, 2016, 4 pages.
Pan, Heping, "Fuzzy Bayesian Networks—A General Formalism for Representation, Inference and Learning with Hybrid Bayesian Networks," vol. 14, Issue 07, Nov. 2000, 29 pages.
Australia Patent Office, Examination Report No. 4 for Australia Application No. 2016244237 dated Oct. 26, 2017, 3 pages.
European Patent Office, European Search Report from EP Application No. 16193865, as published with EP Publication No. 3261022 dated Dec. 27, 2017, pp. 1-5.

* cited by examiner

INTELLIGENT AUTOMATIC LICENSE PLATE RECOGNITION FOR ELECTRONIC TOLLING ENVIRONMENTS

CROSS-REFERENCE TO RELATED APPLICATIONS

This application claims priority under 35 U.S.C. § 119 to Portuguese Provisional Patent Application No. 109486, filed on Jun. 24, 2016, the contents of which is incorporated by reference in its entirety.

TECHNICAL FIELD

This disclosure relates to complex systems and methods for intelligent automatic license plate recognition (IALPR) in an electronic tolling environment.

BACKGROUND

Tolls have been assessed for passage on roadways since the early 20th century. Traditionally, vehicles were required to stop at toll booths or toll plazas where toll booth operators or machines collected tolls manually in the form of cash or coins. However, developments in electronic toll collection (ETC) systems have eliminated the requirement for drivers to carry cash or coins, reduced the manual labor required to collect the tolls, decreased the time for the toll collection process, increased vehicle throughput at toll plazas, and, in some implementations, eliminated the need for vehicles to stop during toll transactions. Many ETC systems use a transponder issued to and associated with a driver or a vehicle. As the vehicle with the transponder passes through a toll collection point (e.g., a toll booth, a toll plaza, or an open road tolling lane or gantry), the transponder communicates its identity to a receiver at the toll collection point and a debit transaction is initiated on an account connected to the transponder in the amount of the assessed toll.

Although ETC systems have both streamlined the collection of tolls for implementing entities and improved the overall toll road experience for most drivers, ETC systems can be subject to mistake and fraud, which can reduce the effectiveness of the ETC system as well as increase the overall cost to implement the ETC system.

DETAILED DESCRIPTION

Figure 1:
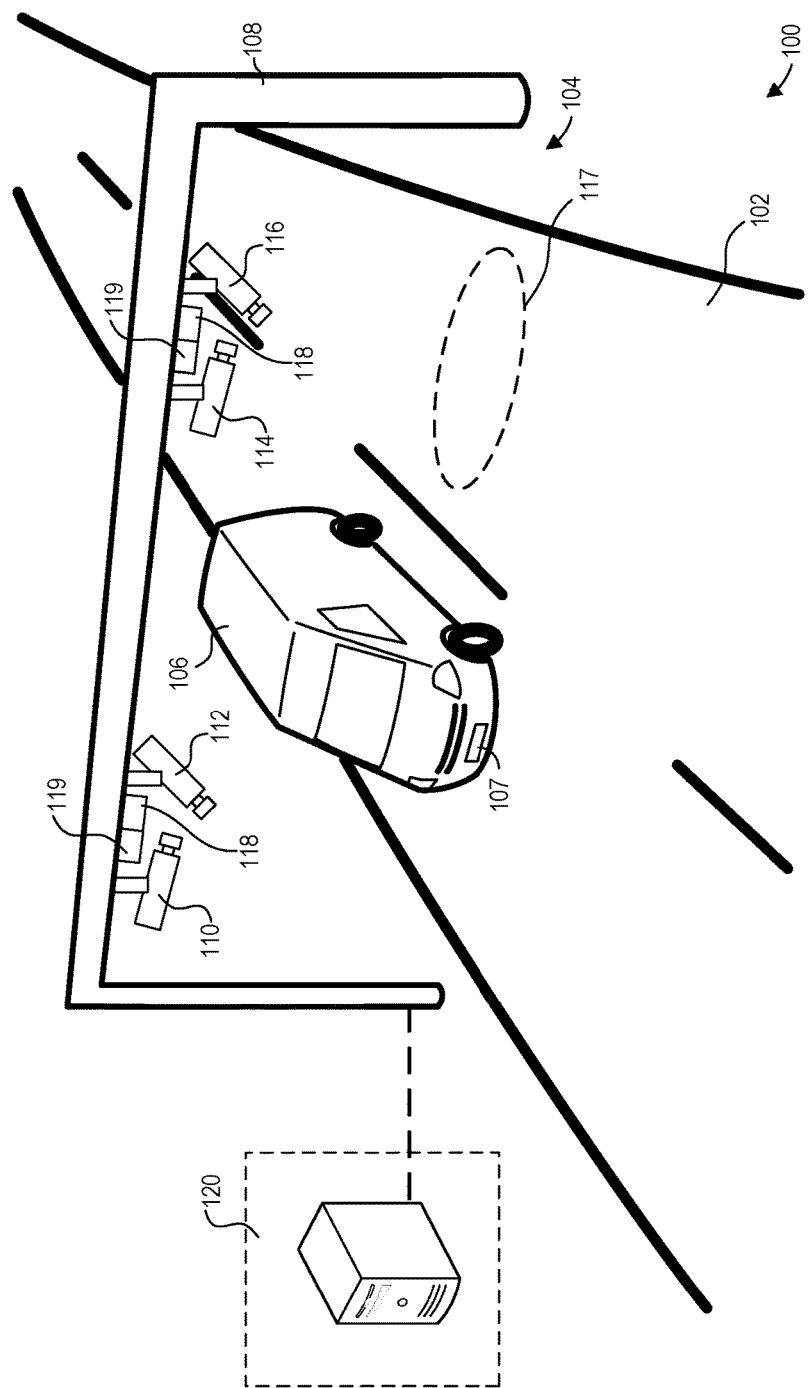
FIG. 1 shows an example electronic tolling environment implementing a portion of an IALPR system.

In certain implementations, a transponder-based ETC system is augmented with or replaced by an Automatic License Plate Recognition (ALPR) system. An ALPR system captures license plate information for vehicles that pass through toll collection points. FIG. 1 illustrates an example electronic tolling environment 100 implementing a portion of an Intelligent Automatic License Plate Recognition (IALPR) system. In this implementation, a roadway 102 includes a toll collection point 104, here shown as an open road tolling gantry wherein a vehicle 106, including a license plate (such as front license plate 107) can pass through the toll collection point 104 without stopping, and in some instances, at full or near-full highway speeds. A support structure 108 supports cameras 110, 112, 114, 116. The support structure 108 may also support other equipment, such as RFID readers 118, vehicle classification loops 117, or vehicle classification lasers 119, lights, signage, or other equipment or devices for the electronic tolling environment 100. The vehicle classification loops 117 or vehicle classification lasers 119 may measure an approximate volume or size of a vehicle passing through the toll collection point 104. For example, the vehicle classification loops 117 may count a number of axels of a vehicle 106 passing through the toll collection point 104. Similarly, a vehicle classification laser 119 may provide a curtain of laser light that measures an approximate size of the vehicle 106 passing through the toll collection point 104. A toll point controller 120 or another device may then map the sensed size to a particular vehicle classification (e.g., passenger vehicle, motorcycle, semi-truck).

The electronic tolling environment 100 may include one or more cameras for each lane of traffic. The cameras may be pointed in one or more directions to capture images of vehicles 106 that are proximate to the toll collection point 104 (e.g., approaching the toll collection point 104, presently at the toll collection point 104, or having passed through the toll collection point 104). For example, as is shown in FIG. 1, cameras 110 and 114 are pointed in a direction opposite the flow of traffic to capture images of the front of approaching vehicles 106 to capture images of front license plates 107. Likewise, cameras 112 and 116 are pointed in the direction of the flow of traffic to capture images of the rear of vehicles 106 passing through the toll collection point 104 to capture images of rear license plates. The cameras 110, 112, 114, and 116 and other equipment (e.g., RFID readers 118 and vehicle classification lasers 119) may be connected to toll point controller 120 to store or process the captured images or other data. The toll point controller 120 may be connected via a network connection (see FIG. 4) to other servers or systems to implement various other aspects of the IALPR solution. The toll point controller 120 and other equipment located at the toll collection point 104 forms a road side system. In some examples, a vehicle is proximate to the toll collection point 104 if it is within a line of sight of the cameras 110, 112, 114, and 116. The line of sight may include vehicles that are 50 feet or 100 feet of the toll collection point 104 along the roadway 102, though other distances may be suitable in various application settings.

A technical challenge exists in that many factors can negatively impact the process of reading license plates on vehicles (e.g., reading the license plate string in an image of a vehicle 106 passing through the toll collection point 104), including environmental conditions (e.g., rain, snow, fog, and sunlight glare), quality of the license plate, cleanliness of the license plate (e.g., which may be subject to dirt build-up or salt build-up on the license plates), time of day, speed of the vehicle 106, speed of reading, or other factors. Due to these and other factors, incorrect license plate identifications may be made during the processing of the images. Incorrect license plate identification can lead to added expense for the entity implementing the electronic tolling solution as the entity will likely have to correct the issue when a incorrectly identified user contests the assessed toll (e.g., after receiving a notice in the mail or electronically that they have been assessed a toll, possibly including fines). Such correction involves the use of additional personnel, equipment, and time to review images and other data, communicate with the user, update incorrect data or transactions, and issue an additional updated toll assessment to a properly identified user. Further, incorrect license plate identification can be frustrating and sometimes costly for incorrectly identified users of the roadway. Accordingly, one goal is reduce the instances of incorrect license plate identification.

Another technical challenge met by the IALPR system is reducing human review of images to determine an identification of a license plate in an image. Human review is costly, requiring a staff of reviewers and associated equipment. Typically, the higher the volume of images to review, the more costly the human review aspect can be. Further, human review, although often more accurate than present ALPR systems, is still prone to mistakes due to inaccuracies caused by perceptual or typographical errors. Accordingly, one technical advantage is the reduction of reliance on the human review process.

One technical solution includes multiple layers of license plate recognition processes and probability evaluation circuitry to evaluate and analyze the various outputs from those processes to determine and identify a license plate in the image. In another implementation, behavior analysis circuitry may determine aspects relating to the behavior (e.g., in terms of tolling activities) of a vehicle associated with a license plate. The behavior analysis circuitry may also provide information to the probability evaluation circuitry, which may improve the overall confidence level of a license plate identification.

Figure 2:
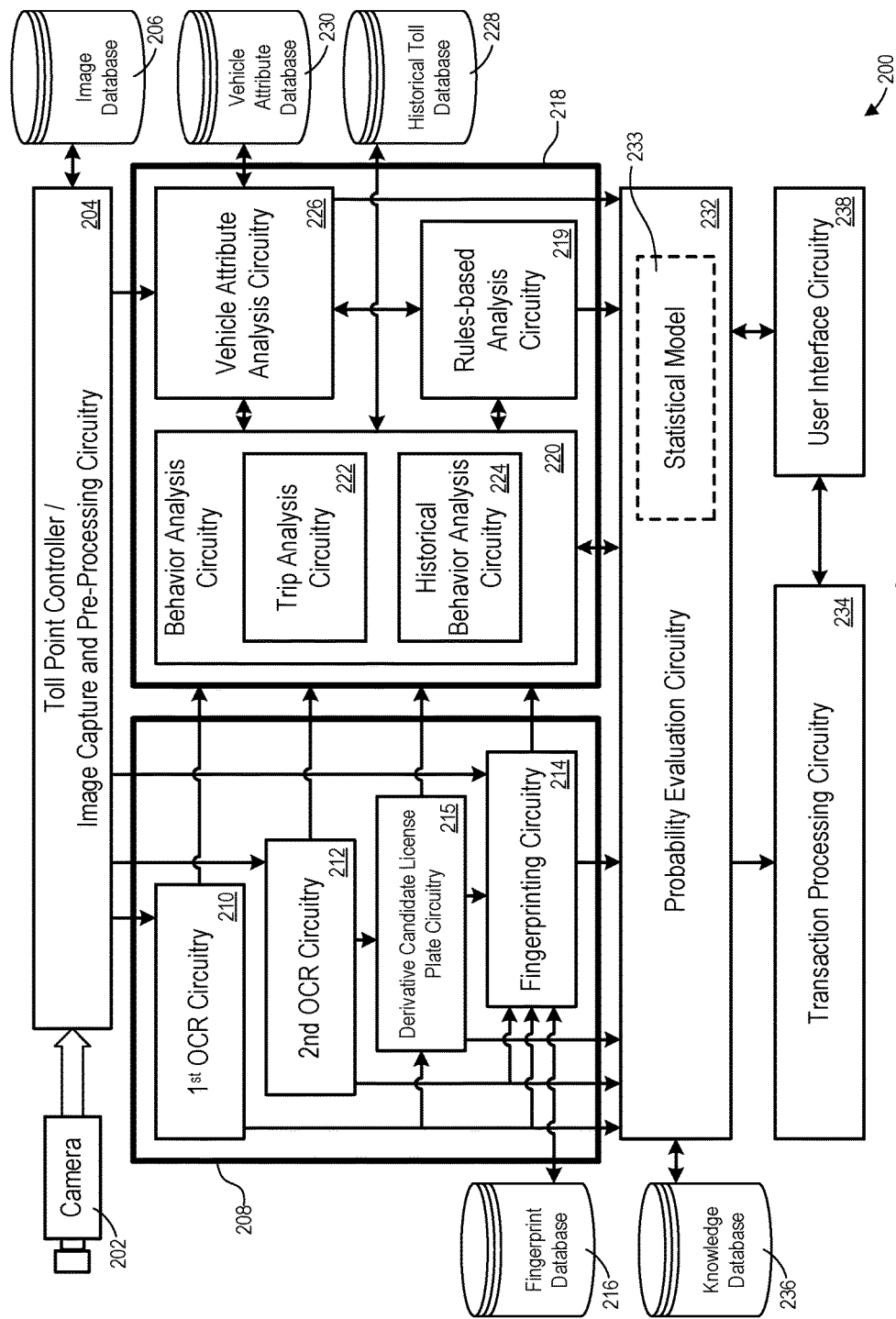
FIG. 2 shows an example block diagram of an IALPR system.

FIG. 2 shows an example block diagram of the IALPR system 200. The system 200 may include a camera 202 (e.g., such as cameras 110, 112, 114, and 116) to capture images of vehicles and their license plates as they pass through toll collection points. The camera 202 is connected to toll point controller 204, which may implement capturing, storage, or pre-processing of the images from the camera 202. The toll point controller 204 may be physically located near the toll collection point 104, for example, in a building or structure located adjacent to or near the roadway 102. Alternatively, the toll point controller 204 may be located remotely from the camera 202 and may communicate with the camera 202 over a communication link, e.g., a network connection. Images may be captured and saved continuously in time. Alternatively, images may be captured and saved upon the occurrence of a toll event. For example, the toll point controller 204 may recognize the presence of a vehicle in an image frame by monitoring a video feed received form the camera 202 for vehicles. Alternatively, radar or other presence detection devices may be employed to detect a vehicle entering the tolling lanes, which can in turn trigger the camera 202 to capture images of the vehicle.

The toll point controller 204 may save images from the camera 202 in an image database 206, and may include toll event data and/or other metadata associated with the captured image. For example, information regarding location, date, time, speed, vehicle class, weather, camera settings, or other metadata can be stored in the image database 206. The image database 206 may be located at the toll point controller 204, or may be centrally located and accessed via a network connection (see, e.g., database 448 in FIG. 4), such that captured images are stored within a centralized data warehouse. For example, a centralized data warehouse may serve multiple or all toll collection points within a roadway system (e.g., for a state or region). The stored image and its associated data may be later transferred to other systems or circuitry for further processing. Alternatively, those other systems may be granted access to the image and its associated data directly from the image database 206.

After an image is captured, the image can be processed to determine the identification of the license plate of the vehicle in the image. Primary analysis circuitry 208 may be employed to provide a first analysis of the image. In one implementation, the primary analysis circuitry 208 includes first optical character recognition (OCR) circuitry 210. The first OCR circuitry 210 may receive the image including a representation of the license plate of the vehicle when the vehicle is proximate to the toll collection point, for example, via a communication interface. The first OCR circuitry 210 may receive the image from the toll point controller 204 or from the image database 206.

The first OCR circuitry 210 performs an OCR process on the image of the license plate to determine a candidate license plate string, as well as a state or other jurisdiction identification of the license plate. The first OCR circuitry 210 identifies the location of the license plate within the image of the vehicle and recognizes characters within the license plate to determine the candidate license plate string. One example OCR technique includes a matrix matching algorithm (also called pattern matching, pattern recognition, or image correlation), in which images are compared to stored images of glyphs, which are specific shapes, designs, or representations of a character (e.g., a letter, number, or symbol). Another example OCR technique includes a feature extraction algorithm where individual characters within the image are separated into features, such as lines, closed loops, line directions, and line intersections. These extracted features are then compared with abstract vector-like representations of characters to determine which character matches the character in the image.

Particular OCR techniques may be application-oriented or otherwise customized, for example, to search for particular symbols on license plates (e.g., to identify a state or jurisdiction) and to identify letters and numbers in the form of specific fonts used by the state or jurisdiction. For example, most states or jurisdictions will issue license plates with one of only a small selection of similar fonts or typefaces. Example common fonts or typefaces include DIN 1451, Eurostile, Humanist sans, or combinations thereof, with some jurisdictions implementing variations on those typefaces. Other similar typefaces may be used. With this limited set of typefaces used on license plates, OCR circuitry may be configured to search specifically for those typefaces, thereby limiting the number of possible comparisons to be performed or possible candidate characters for each character in an image.

Similarly, in various implementations, second OCR circuitry 212 may be included as part of the primary analysis circuitry 208. The second OCR circuitry 212 may also perform an OCR process on the image of the license plate to determine a candidate license plate string, as well as a state or jurisdiction identification of the license plate. The second OCR circuitry 212 may implement a different OCR process, technique, or algorithm than the first OCR circuitry 210 in order to diversify the methods used to develop candidate license plate strings. For example, the first OCR circuitry 210 may implement a matrix matching technique while the second OCR circuitry 212 may implement a feature extraction technique. In another approach, the first OCR circuitry 210 may implement a first OCR algorithm provided by a first provider, while the second OCR circuitry 212 may implement a different second OCR algorithm provided by a second provider different from the first provider. If the two different OCR processes implemented by the first OCR circuitry 210 and the second OCR circuitry 212 return a same resulting license plate string or license plate identification, then a confidence in the identity of the license plate may be increased.

When a candidate license plate string is determined, system circuitry, such as the first OCR circuitry 210 or the second OCR circuitry 212, may cross-reference the candidate license plate string to a license plate database to correlate the license plate string to a license plate identification. In certain implementations, the license plate string and the license plate identification are the same (e.g., a license plate string of "ABC123" for the state of Illinois may simply be identified as Illinois license plate ABC123). In other approaches, the identification may include a state, jurisdiction, plate type, or other characteristic in addition to or instead of the license plate string. Accordingly, the license plate identification may be a number or identification that does not include the license plate string (e.g., the name or driver's license number of the owner, the VIN number of the vehicle, or some other identifier).

The first OCR circuitry 210 and the second OCR circuitry 212 can also determine an OCR confidence level representing the level of confidence or probability at which the first and second OCR circuitry 210, 212 has determined the license plate string, the license plate identification, or both. In a similar manner, first OCR circuitry 210 and the second OCR circuitry 212 can also determine an OCR confidence level for each determined character of a license plate string. That is to say, the first OCR circuitry 210 or the second OCR circuitry 212 may determine a confidence level or probability that it has properly recognized an individual character in the license plate string. The OCR confidence level may be affected by many different factors, including environmental factors that impact the quality of the image of the license plate at the toll collection point, quality of the license plate, the cleanliness of the license plate, or other obstructions or image quality factors.

The primary analysis circuitry 208 may also include derivative candidate license plate circuitry 215. The derivative candidate license plate circuitry 215 can receive the candidate license plate strings or identifications and the OCR confidence levels for each determined license plate string or each individual character of a license plate string from the first and second OCR circuitry 210, 212. The derivative candidate license plate circuitry 215 can replace characters having lower confidence levels, for example, character confidence levels below a character confidence level threshold, with alternative characters leading to more derivative candidate license plates. Choosing alternative characters may follow rules. For example, if the first or second OCR circuitry determines a license plate jurisdiction, there is the possibility that the license plate would follow a determined mask. Therefore, given the position of the character to be replaced within the candidate license plate string, the derivative candidate license plate circuitry 215 may know if the character is alphabetic or numeric and can create additional derivative candidate license plates taking into account the correct character type for the character to be replaced. In another approach, the derivative candidate license plate circuitry 215 may determine similar characters for character to be replaced. For example, the letter "O" can be frequently mistaken as the number "0", or vice versa, while the letter "G" can be frequently mistaken as the letter "O" or the number "8". These frequent misread characters can be stored within a database that is accessed by the derivative candidate license plate circuitry 215. The derivative candidate license plate circuitry 215 can determine replacement characters that are in the category of frequent misread characters and generate derivative candidate license plates resulting from replacements of characters in the category of frequent misread characters. These resulting derivative candidate license plates have a higher probability of being correct.

The primary analysis circuitry 208 may include, in some implementations, fingerprinting circuitry 214. The fingerprinting circuitry 214 may determine a fingerprint of the license plate in the image and compare that fingerprint to any number of previously defined fingerprints stored in a fingerprint database 216. A fingerprint may be a type of visual signature for the license plate, including specific visual characteristics of the license plate, which may be saved for future reference and comparison. The fingerprint can also include parts of the vehicle surrounding the license plate, such as the bumper or grille of the vehicle, which is additional useful information that can lead to more accurate matching results. Different images of a single license plate may produce similar fingerprints such that the fingerprinting circuitry 214 can determine the identification of a license plate due to its similarity to a stored fingerprint of that same license plate. For example, the fingerprint database 216 may include a fingerprint having similar interest points with similar characteristics and locations to that of the fingerprint generated from the image of the license plate on the vehicle at the toll collection point. These similar fingerprints allow the fingerprinting circuitry 214 to make a determination that the two fingerprints match.

The stored fingerprint has a license plate identification associated therewith such that the fingerprinting circuitry 214 can then cross-reference the determined stored fingerprint with the license plate identification to determine the license plate identification. As with the first and second OCR circuitry 210, 212, the fingerprinting circuitry 214 can also determine a fingerprint confidence level representing the level of confidence or probability which the fingerprinting circuitry 214 has determined the proper license plate identification. The fingerprint confidence level may be affected by many factors, including environmental factors that impact the quality of the image of the license plate at the toll collection point or the quality of the image that was used to generate a previous fingerprint stored within the fingerprint database 216. The fingerprinting circuitry 214 may store updated fingerprints in the fingerprint database 216 at any time, e.g., after making an identification that exceeds a threshold confidence level.

In another approach, the fingerprinting circuitry 214 receives the candidate license plate strings from the first and second OCR circuitry 210 and 212 and the derivative candidate license plate strings from the derivative candidate license plate circuitry 215. The fingerprinting circuitry 214 then queries the fingerprint database 216 to receive stored fingerprints for each of the candidate and derivative candidate license plate strings. The fingerprinting circuitry 214 then compares the fingerprint of the license plate in the image with the retrieved fingerprints for the candidate and derivative candidate license plate strings. Comparing fingerprints requires significant processing power. Thus, by the fingerprinting circuitry 214 limiting its queries to the candidate and derivative candidate license plate strings, the required processing is reduced and the chances to determine a match by leveraging both systems in combination is increased. In one embodiment, the fingerprinting circuitry 214 may perform a full scan of stored fingerprints within the fingerprint database 216 if the fingerprinting circuitry does not receive candidate or derivative candidate license plates.

In another implementation, the system 200 includes secondary analysis circuitry 218. The secondary analysis circuitry 218 may include rules-based analysis circuitry 219 and behavior analysis circuitry 220, which in turn may include trip analysis circuitry 222, historical behavior analysis circuitry 224, or both. The secondary analysis circuitry 218 may also include vehicle attribute analysis circuitry 226. The secondary analysis circuitry 218 may also include one or more communication interfaces (e.g., communication interface 436 in FIG. 4) to receive data from other circuitry elements, for example, from the toll point controller 204, the first OCR circuitry 210, the second OCR circuitry 212, the fingerprinting circuitry 214, or other circuitry elements. The communication interface may be configured to receive candidate license plate identifications associated with images of vehicles proximate to a current toll collection point during or after a toll event. The communication interface may also receive confidence levels associated with the candidate license plate identifications. The secondary analysis circuitry 218 may include circuitry elements that implement secondary analysis of license plate identifications provided by the primary analysis circuitry 208. This secondary analysis may serve to increase or decrease an overall confidence level associated with a candidate license plate identification for an image or set of images of a vehicle proximate to a toll collection point.

The secondary analysis may also help identify which one of a set of candidate license plate identifications is most likely the correct license plate identification. For example, the different circuitry elements 210, 212, and 214 within the primary analysis circuitry 208 may provide different candidate license plate identifications from each other. Further, the various circuitry elements 210, 212, and 214 may also each provided derivative candidate license plate identifications and the derivative candidate license plate circuitry 215 may also provide derivative candidate license plate identifications. The secondary analysis circuitry 218 may help determine which one of the multiple license plate identifications is the proper identification based on behavioral analysis and vehicle attribute analysis, discussed below. This may be achieved by increasing or decreasing the overall confidence levels (e.g., probabilities) associated with each candidate license plate identification through the secondary analysis process.

Figure 4:
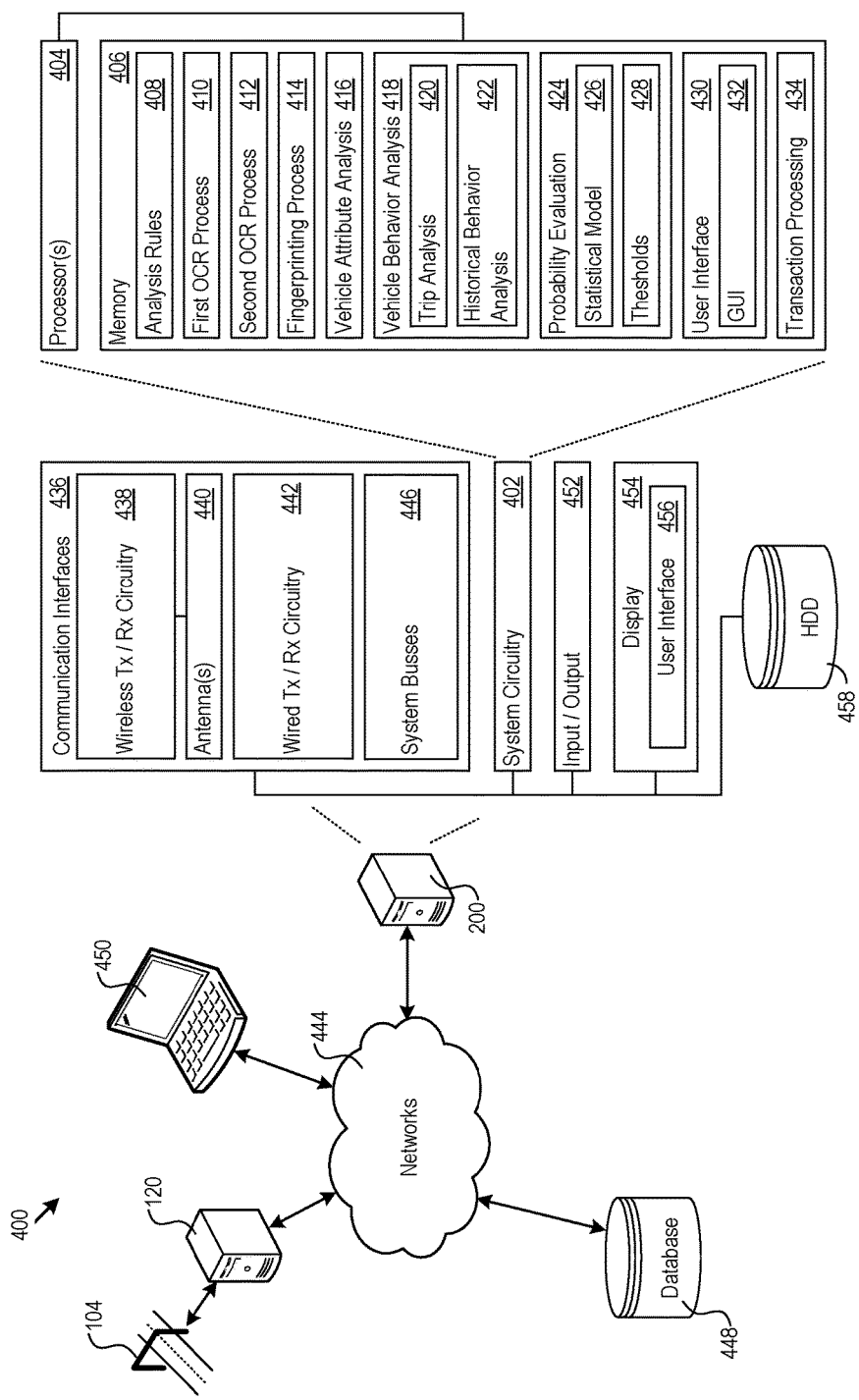
FIG. 4 shows an example system implementation for the IALPR system.

The rules-based analysis circuitry 219 may analyze or evaluate one or more candidate or derivative candidate license plate strings or identifications provided by the primary analysis circuitry 208 according to one or more analysis rules, for example as may be stored within memory 406 (see FIG. 4). The rules-based analysis circuitry may evaluate and compare the candidate and derivative candidate license plate strings determined for the front and the rear license plates of a vehicle. Together with vehicle class information (e.g., received from vehicle classification loop 117 or vehicle classification laser 119), the rules-based analysis circuitry 219 can evaluate the license plates to determine if one is incorrect or if both match. For example, light vehicles (e.g., passenger vehicles, motorcycles, or light trucks) should have the same front and rear license plates. However, heavy trucks may have a front license plate for the tractor that is different from the rear license plate for the trailer. If the system 200 determines that the vehicle is a light vehicle class, but the candidate license plate strings or identifications are different for the front and the rear, the rules-based analysis circuitry 219 will determine that one or both candidate license plate strings are wrong. Further, the rules-based analysis circuitry 219 may analyze candidate and derivative candidate license plate strings to determine matching pairs of license plate strings. As a result, the rules-based analysis circuitry 219 may generate a determined license plate string or identification and an associated confidence level.

The behavior analysis circuitry 220 may be coupled to a communication interface (e.g., communication interface 436 of FIG. 4) and may be configured to perform a behavioral analysis of geospatial vehicle positioning on a received candidate license plate identification. For example, the behavior analysis circuitry 220 may examine historical toll data within an historical toll database 228 to determine a behavior of the vehicle within a trip context (e.g., looking at neighboring or related toll events that would indicate a particular vehicle with a candidate license plate identification is on a trip that would include the present toll collection point). The behavior analysis circuitry 220 may also determine vehicle behavior patterns (e.g., to determine a likelihood that a vehicle with a candidate license plate would pass the present toll collection point during a particular day or time, for example, during a typical commute to or from work). The behavior analysis circuitry 220 may then generate behavioral information, which may include historical data related to the candidate license plate identification, an increased or decreased probability or confidence level associated with a candidate license plate identification, or an indication that a condition has been met. An indication that a condition has been met may include an indication that a related toll event occurred for a candidate license plate identification at a neighboring or sequential toll collection point within a certain time range, or that a behavior pattern exists for the candidate license plate identification that corresponds with a current toll event.

The behavior analysis circuitry 220 may include trip analysis circuitry 222. In one approach, the trip analysis circuitry 222 may analyze a candidate license plate identification for a current toll event in view of related toll events. The related toll events may be events, for instance, that occur near to the current toll event or within a time frame (e.g., within an hour, within the same day or 24-hour span, within a time frame corresponding related to an average travel time between two toll collection points, or other time frames) before or after the current toll event. For example, the trip analysis circuitry 222 may be configured to search for one or multiple related toll events occurring at a related toll collection point(s) with respect to the current toll collection point. The related toll event(s) may have associated therewith a license plate identification matching the candidate license plate identification. For example, a related toll collection point may be an adjacent, neighboring, sequential, or other toll collection point along a particular roadway or route, along a connecting roadway or route (e.g., a roadway that merges or feeds into the current roadway of the current toll collection point), or along a different roadway or route. A different roadway or route may include a roadway that does not directly feed into the current roadway, but is within a determined driving distance therefrom or is accessible to/from the current roadway, for example, via state or local roads or other non-toll roads. A related toll event is a toll event occurring before or after the current toll event at the other toll collection point. A related toll event may occur after the current toll event, for example, if the analysis of the toll event occurs some time after the occurrence of the current toll event, such that other toll events may have occurred in the interim. These later-in-time related toll events may also be considered in the analysis of a trip for the vehicle of the candidate license plate identification.

The trip analysis circuitry 222 may also be configured to determine a current travel time between the related toll event and the current toll event, which may be determined from a time difference between the occurrence of the current toll event and the occurrence of the related toll event. The trip analysis circuitry 222 may also be configured to determine an average travel time between the current toll collection point and the related toll collection point. This average travel time may be determined based on historical travel times, and may take into account daily traffic patterns (e.g., increasing average travel time during rush hour). Further, the determination of the average travel time may take into account present traffic conditions that may impact travel time, for example, as may be determined in real-time using known techniques. The trip analysis circuitry 222 may take a vehicle class (e.g., truck or passenger vehicle) into account as well when determining average travel time (e.g., a truck may take longer to travel between two toll collection points than a passenger vehicle). Further, the trip analysis circuitry may take into account any known historical tendencies associated with the vehicle (e.g., the driver of the vehicle) associated with the license plate identification in determining average travel time (e.g., that the vehicle associated with the license plate identification typically completes a travel time between two toll collection points an average of 5% quicker than the average travel time).

In one implementation, the trip analysis circuitry 222 is configured to determine a degree of difference between the current travel time and the average travel time. The direction of travel of the vehicle in the image of the current toll event may be considered, as well. With this degree of difference, the trip analysis circuitry 222 can determine whether it is less or more likely that two toll collection events associated with a candidate license plate identification are indeed linked as part of a trip by a vehicle. For example, if two adjacent toll collection points each register toll events with the same candidate license plate identification, and the time between the two toll events is commensurate with the average travel time therebetween, then there is an increased likelihood that it is the same vehicle, and therefore that the candidate license plate identification, as identified in two (or more) separate images at two different toll collection points, is indeed the correct license plate identification. The trip analysis circuitry 222 may generate behavioral information, which may include an increased or decreased probability or confidence level associated with a candidate license plate or an indication that a condition has been met (e.g., that the current toll event occurred within a time range from a related toll event at a different toll collection point). Variations are possible.

In another implementation, the behavior analysis circuitry 220 includes historical behavior analysis circuitry 224. The historical behavior analysis circuitry 224 may be configured to analyze a candidate license plate identification for a current toll event in view of historical toll events. The historical toll events (e.g., occurring over weeks, months, or years) may provide a daily, weekly, or monthly pattern of toll transactions that correlate to the likely activities of a particular vehicle associated with a license plate identification. For example, a pattern may be determined that a vehicle with a license plate identification travels along a particular route including one or more particular toll collection points every weekday morning during typical commuting times (e.g., between 6:00 AM and 10:00 AM). Accordingly, with this toll pattern established, if a candidate license plate identification is determined for a toll event at a certain toll event time at a certain toll collection point, and that candidate license plate identification matches a license plate identification with a corresponding toll pattern (e.g., a daily toll time range) into which the current toll event time and location fits, then there may be an increased likelihood that the candidate license plate identification is indeed the correct license plate identification for that toll event.

To perform a historical vehicle behavioral analysis, in one implementation, the historical behavior analysis circuitry 224 is configured to search for historical toll events occurring at the current toll collection point with a license plate identification matching the candidate license plate identification. The historical toll events may be stored and accessed within a historical toll database 228. The historical behavior analysis circuitry 224 may also determine a historical daily toll event pattern including a daily toll time range for the license plate identification responsive to the plurality of historical toll events. The daily toll event pattern may be predetermined or may be determined in real time when a toll event occurs for a candidate license plate identification. The daily toll time range may include multiple ranges and may take direction of travel into account. For example, it may be determined that a vehicle associated with a license plate identification passes through a toll collection point headed in one direction during a morning commute, and passes through the same or a different toll collection point in a different direction during an evening commute. The daily toll event pattern may be for every day of the week, for only certain days of a week (e.g., Monday-Friday, every other Tuesday and Thursday only, weekends only, every workday except for Friday, or any other variation), or may be for only certain days or weeks of a month of a year (e.g., the $2^{nd}$ of every month, the third Tuesday of a month, or twice a week from October through April). For example, the historical behavior analysis circuitry 224 may determine a pattern for a license plate identification of a trick wherein the truck passes through a certain toll collection point in one direction at least once a week or once a month (e.g., on a weekly or monthly route), but does not know exactly which day that may occur. Many pattern variations are possible and are not necessarily limited to daily patterns. The historical behavior analysis circuitry 224 may take a vehicle class (e.g., truck or passenger vehicle) into account as well when determining a toll pattern.

The historical behavior analysis circuitry 224 may be configured to determine whether the current toll event occurred within the daily (or weekly or monthly) toll time range associated with a license plate identification matching the candidate license plate identification. If so, then there may be an increased likelihood that the candidate license plate identification is indeed the correct license plate identification for the current toll event. The historical behavior analysis circuitry 224 may then generate behavioral information, which may include historical data related to the candidate license plate, an increased or decreased probability or confidence level associated with a candidate license plate, or an indication that a condition has been met (e.g., that the current toll event occurred within a daily toll time range associated with a license plate identification matching the candidate license plate identification).

In another implementation, the secondary analysis circuitry 218 includes vehicle attribute analysis circuitry 226. The communication interface (e.g., communication interface 436 of FIG. 4) may be configured to receive a physical vehicle attribute of a vehicle in an image, for example, from toll point controller 204 or another circuitry element. Alternatively, the vehicle attribute analysis circuitry 226 receives the image (e.g., via the communication interface) and determines a physical vehicle attribute of the vehicle in the image. Examples of physical vehicle attributes include vehicle class (e.g., passenger vehicle, truck, or bus), vehicle color, number of axles, size, vehicle make, or vehicle model, though other physical vehicle attributes may be possible. Physical vehicle attributes may be extracted from the image via known techniques for categorizing items within an image.

The vehicle attribute analysis circuitry 226 may determine whether the physical vehicle attribute extracted from the image matches a pre-determined vehicle attribute associated with a license plate identification matching the candidate license plate identification. For example, the vehicle attribute analysis circuitry 226 may receive the candidate license plate identification from circuitry elements of the primary analysis circuitry 208. The vehicle attribute analysis circuitry 226 may then determine a license plate identification matching the candidate license plate identification within a connected vehicle attribute database 230. The vehicle attribute database 230 may include various pre-determined physical vehicle attribute data associated with different license plate identifications. The stored pre-determined physical vehicle attribute data may be extracted from vehicle registration information (e.g., listing vehicle class, color, make, model, year, color, and other attributes), which may be sourced from account registration (e.g., registration for an account of the ETC system) or from department of motor vehicles information. The stored pre-determined physical vehicle attribute data may also be generated over time from previous historical toll events where physical vehicle attributes are extracted during the previous toll events and stored within the vehicle attribute database 230 associated with a license plate identification. The vehicle attribute analysis circuitry 226 may then cross-reference the physical vehicle attributes extracted from the image against the pre-determined physical vehicle attributes associated with the license plate identification matching the candidate license plate identification. If there is a match, then there may be an increased likelihood that the candidate license plate identification is the correct license plate identification for the particular toll event.

The vehicle attribute analysis circuitry 226 may also determine a physical vehicle attribute matching confidence level indicating the level of confidence or probability that the physical vehicle attributes are correctly extracted and identified, or the degree to which the physical attributes match (e.g., the vehicle class and make may match, but the color may be off slightly, for example, if a navy blue color was extracted from the image, but the registered color is black). Many matching factors may be taken into account in determining the physical vehicle attribute matching confidence level. The vehicle attribute analysis circuitry 226 may generate and output attribute matching information, which may include particular matching or mismatching physical attributes between a candidate license plate identification and a corresponding stored license plate identification, as well as levels of confidence for each particular attribute. The attribute matching information may also include an increased or decreased probability or confidence level associated with a candidate license plate or an indication that a condition has been met (e.g., that all or some of the extracted physical vehicle attributes match stored pre-determined physical vehicle attributes). The vehicle attribute analysis circuitry 226 may update or maintain the pre-determined physical vehicle attribute data within the vehicle attribute database 230 over time, for example, to account for incorrect previously stored data. For example, if the vehicle was incorrectly registered as blue, but the vehicle attribute analysis circuitry 226 repeatedly determines that the vehicle associated with that license plate identification is white, the vehicle attribute analysis circuitry 226 may update the physical vehicle database with the corrected information, accordingly.

Probability evaluation circuitry 232 receives data from some or all of the various circuitry elements discussed above (e.g., the first OCR circuitry 210, the second OCR circuitry 212, the fingerprinting circuitry 214, the behavior analysis circuitry 220, or the vehicle attribute analysis circuitry 226). From the received data, the probability evaluation circuitry 232 may then determine a correct license plate identification for the toll event and determine an overall confidence level associated with that correct license plate identification. By analyzing all of the provided data, the probability evaluation circuitry 232 can provided a higher degree of certainty that a particular candidate license plate identification is the correct (or incorrect) license plate identification for a toll event. As a result, the system 200 reduces or eliminates the need for human review and reduces the likelihood that an incorrect license plate identification will be made, thereby reducing costs associated with incorrectly assessing tolls on incorrectly identified license plates.

The probability evaluation circuitry 232 may receive the candidate license plate identifications that each circuitry element may have determined for a given image. Also, the probability evaluation circuitry 232 may receive a confidence level representing the probability that each provided candidate license plate identification is the correct license plate identification for an image of a vehicle during a toll event. For example, the probability evaluation circuitry 232 may receive a first OCR confidence level from the first OCR circuitry 210, a second OCR confidence level from the second OCR circuitry 212, and a fingerprint confidence level from the fingerprinting circuitry 214. Moreover, the probability evaluation circuitry 232 may receive data for multiple images corresponding to one vehicle passing through the toll collection point during a toll event. For example, the probability evaluation circuitry 232 may receive data from some or all of the circuitry elements (e.g., 210, 212, 214) corresponding to one or multiple images of the front license plate of the vehicle as well as one or multiple images of the rear license plate of the vehicle passing through the toll collection point during the toll event.

In one implementation, the probability evaluation circuitry 232 may determine an intermediate confidence level for the candidate license plate identification received from one or more circuitry elements of the primary analysis circuitry 208. For example, the probability evaluation circuitry 232 may receive and review candidate license plate identifications from the first OCR circuitry 210, the second OCR circuitry 212, or the fingerprinting circuitry 214 corresponding to an image or set of images associated with a vehicle proximate to a toll collection point. Further, the probability evaluation circuitry 232 may receive the first OCR confidence level from the first OCR circuitry 210, second OCR confidence level from the second OCR circuitry 212, or fingerprint confidence level from the fingerprinting circuitry 214. Further, if the vehicle includes both front and rear plates and is determined to be a light vehicle class, and the generated candidate license plate strings match for readings of the front and rear license plates, the rules-based analysis circuitry 219 may provide an increased confidence level for the matching pair of candidate license plate strings. The probability evaluation circuitry 232 may determine the intermediate confidence level based on this received data.

In one implementation, the probability evaluation circuitry 232 determines if the intermediate confidence level exceeds an intermediate confidence level threshold. If so, then the probability evaluation circuitry 232 may decide to forgo secondary analysis by the secondary analysis circuitry 218 and instead determine that the candidate license plate identification is the correct license plate identification for the toll event. For example, in various implementations, the probability evaluation circuitry 232 may control whether the secondary analysis circuitry 218 performs a secondary analysis of any candidate license plate identification(s) generated by the primary analysis circuitry 208, and may determine that secondary analysis is not to be performed on the candidate license plate identification. The probability evaluation circuitry 232 may also determine the overall confidence level for the candidate license plate identification as being equal to or similar to the intermediate confidence level. Moreover, the probability evaluation circuitry 232 may receive notification from the rules-based analysis circuitry 219 indicating that the candidate license plate strings match for the front and rear plates of a vehicle. In such an instance, the probability evaluation circuitry 232 may also decide to forgo secondary analysis by the secondary analysis circuitry 218. The probability evaluation circuitry 232 may send the candidate license plate identification (e.g., as the correct license plate identification for a toll event) to transaction processing circuitry 234 to effect billing and collection of the assessed tolls against any accounts or individuals associated with the candidate license plate identification. The transaction processing circuitry 234 may effect billing and collection in accordance with known or typical methods.

For example, if the first OCR circuitry 210, the second OCR circuitry 212, or the fingerprinting circuitry 214 all determine the same candidate license plate identification, then the probability evaluation circuitry 232 may determine a high intermediate confidence level associated with the candidate license plate identification. Further, if some or all the first OCR circuitry 210, the second OCR circuitry 212, or the fingerprinting circuitry 214 individually provide high levels of confidence, then the probability evaluation circuitry 232 may determine a high intermediate confidence level associated with the candidate license plate identification. Moreover, if the rules-based analysis circuitry 219 indicates that the front and rear candidate license plate strings match, the probability evaluation circuitry 232 may determine a high intermediate confidence level associated with the candidate license plate identification. In various embodiments, a confidence level of 0.6, 0.7, 0.8, 0.9, or another confidence level value on a scale from 0.0 to 1.0 may represent a high confidence level or a high intermediate confidence level.

In one example, if one circuitry element of the primary analysis circuitry 208 provides a first candidate license plate identification, while a different circuitry element provides a different second candidate license plate identification, the probability evaluation circuitry 232 may analyze potential derivative candidate license plate identifications for the toll event from that different circuitry element to see if any of the derivative candidate license plate identifications match the first candidate license plate identification. If a match is determined, the probability evaluation circuitry 232 may determine that the first candidate license plate identification is the correct license plate identification for the toll event and may determine the overall confidence level or intermediate confidence level associated with the first candidate license plate identification is still relatively high. The probability evaluation circuitry 232 may also take into account the various confidence levels associated with the first candidate license plate identification, the second candidate license plate identification, and the derivative candidate license plate identifications when making this determination. Alternatively, in the event of a mismatch between any results from the various circuitry elements of the primary analysis circuitry 208, the probability evaluation circuitry may lower the intermediate confidence level, for example, to a level below the intermediate confidence level threshold, or may automatically invoke secondary analysis by the secondary analysis circuitry 218.

In various implementations, if the intermediate confidence level does not exceed the intermediate confidence level threshold, the probability evaluation circuitry 232 may still utilize the services of or information provided by one or more circuitry elements of the secondary analysis circuitry 218. Alternatively, in some implementations, the probability evaluation circuitry 232 may always or often utilize the services of or information provided by one or more circuitry elements of the secondary analysis circuitry 218 independent of any calculated intermediate confidence level, and may not calculate an intermediate confidence level at all.

In various implementations, the probability evaluation circuitry 232 also receives information from the secondary analysis circuitry 218. For example, the probability evaluation circuitry 232 may receive behavioral information from the behavior analysis circuitry 220 (including information from the trip analysis circuitry 222 or the historical behavior analysis circuitry 224) or attribute matching information from the vehicle attribute analysis circuitry 226. Additionally, in some implementations, the probability evaluation circuitry 232 may control the operation of the secondary analysis circuitry 218, for example, by determining whether or not to have various circuitry elements of the secondary analysis circuitry 218 perform a secondary analysis on candidate license plate identifications.

After receiving the information from the secondary analysis circuitry 218 or the primary analysis circuitry 208, the probability evaluation circuitry 232 can determine an overall confidence level for a candidate license plate identification. Further, the probability evaluation circuitry 232 can determine a correct license plate identification from amongst multiple candidate license plate identifications provided by the other circuitry elements. In one implementation, if the overall confidence level for a candidate license plate identification exceeds a minimum confidence threshold, then the probability evaluation circuitry 232 may send the candidate license plate identification as the correctly identified license plate identification to the transaction processing circuitry 234 to effect billing and collection of the toll.

In various implementations, the probability evaluation circuitry 232 includes a statistical model of random variables 233. The statistical model of random variables 233 may receive as inputs any or all of the data received from the primary analysis circuitry 208 or the secondary analysis circuitry 218. For example, the statistical model of random variables 233 may receive an identification confidence level (e.g., for a candidate license plate identification) from the primary analysis circuitry 208 (e.g., from the first OCR circuitry 210, the second OCR circuitry 212, or the fingerprinting circuitry 214) and behavioral information or attribute information from the secondary analysis circuitry 218 (e.g., historical toll data for a candidate license plate identification, a confidence level modifier, a modified confidence level for the candidate license plate identification, an indication that a condition has been met, or associated confidence levels associated with the generation of the above stated data). The statistical model of random variables 233 may also receive the candidate license plate identification. The statistical model of random variables 233 may then be executed to generate the overall confidence level for the candidate license plate identification. With this information, the probability evaluation circuitry 232 can determine whether or not the candidate license plate identification is the correct license plate identification for a toll event (e.g., based on a minimum overall confidence level threshold), or can determine which candidate license plate from multiple candidate license plates is the correct license plate identification for a toll event.

In one implementation, the statistical model of random variables 233 is implemented in a Bayesian network (also called a Bayes network, belief network, Bayesian model, or probabilistic directed acyclic graphical (DAG) model). In another implementation, the statistical model of random variables 233 is a fuzzy Bayesian network (FBN) A FBN accounts for imprecise boundaries for categorizations, random variables, or other aspects, through the use of fuzzy numbers or fuzzy logic. In various examples, the FBN considers the set of variables from circuitry elements 208, 212, 214, 215, 220 (including 222 and 224), and 226 as an hybrid set of continuous and discrete values, thus constituting a hybrid Bayesian network where some of the DAG vertices and edges are both discrete and continuous variables. The hybrid Bayesian network is constructed on these sets of variables and their assumed probabilistic correlation. As the historical data for the data sets from the input variables grows, accuracy of general inference that drives the vehicle recognition decision increases, retro-feeding the variables correlation analysis and the model knowledge base, thus making the system learn. Weights of the input variables in the model are configurable, but also accompany the mutating strengths of the correlations. For a base configuration, the impact of the 208, 212, 214, and 215 results are manifold those of the 222, 224 and 226 readings.

In a different approach, statistical model of random variables 233 is a finite state machine that reproduces a Markov chain, which can provide a probability used as a discrete input in the decision. The states are derived from the confidence levels received from each of the circuitry elements 208, 212, 214, 215 220 (including 222 and 224) and 226, in the transition matrix, to reach a cumulative probability vector to be used on a final confidence level threshold decision.

Over time, the statistical model of random variables 233 is trained and retrained with historical and new data such that the accuracy of the statistical model 233 improves over time. The probability evaluation circuitry 232 is connected to a knowledge database 236 that may store various trained statistical models, coefficients, random variable attributes, as well as historical knowledge associated with the statistical model 233 and historical toll events. The knowledge database 236 may be the same as or shared with the vehicle attribute database 230, the historical toll database 228, the fingerprint database 216, and or the image database 206.

In various implementations, if the probability evaluation circuitry 232 determines that the overall confidence level does not exceed a minimum confidence threshold, the probability evaluation circuitry 232 may send the toll event and its associated data (e.g., images and possibly any candidate license plate identifications) to a user interface via user interface circuitry 238 to implement a human review of the toll event to determine or validate a correct license plate identification for the toll event. The user interface circuitry 238 may display the image(s) or any other data about the toll event via a graphical user interface and may receive an external license plate identification for the image(s), for example, from a human reviewing user. The probability evaluation circuitry 232 (or other circuitry elements) may receive the external license plate identification for the image(s) and update one or more database or statistical model accordingly. The external license plate identification data (e.g., from human users) provides valuable information for the system 200 in that the data received is verified for accuracy by a human and therefore provides accurate data points with which the statistical models, OCR processes, fingerprinting processes, behavior analysis processes, or vehicle attribute processes can be improved or refined.

Figure 3:
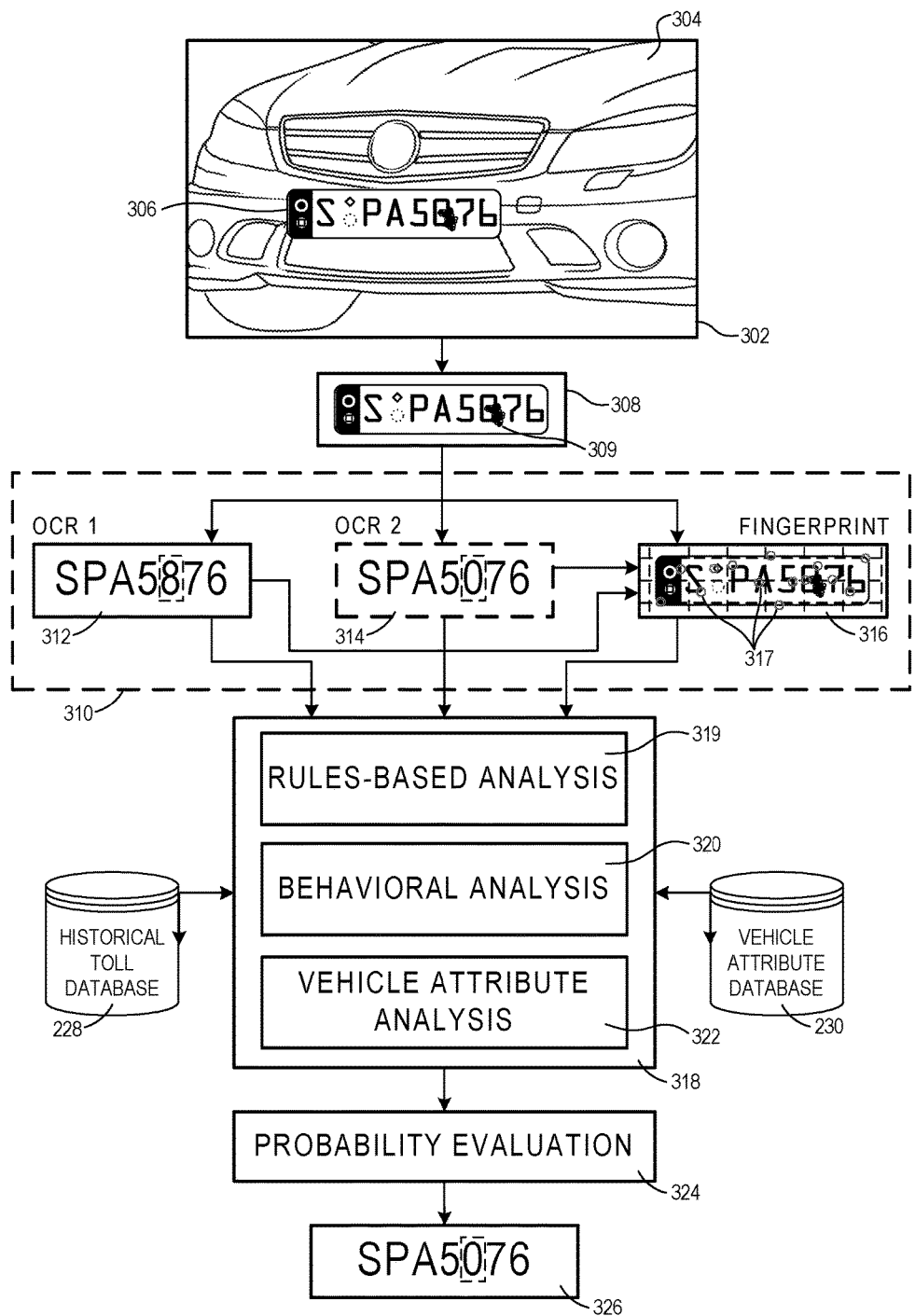
FIG. 3 shows an example application of an IALPR process.

FIG. 3 provides an example application of the various IALPR processes discussed above. An image 302 of a vehicle 304 proximate to a toll collection point, captured by a camera at the toll collection point, includes a license plate 306. A pre-processing circuitry or program may isolate the portion image 302 including the license plate 306, as is shown in the image of the license plate 308. In this hypothetical example, the image of the license plate 308 shows that an obstruction 309 (e.g., dirt, grease, oil, debris, snow, or another obstruction) is obstructing the view of a portion of the license plate, which may impact the analysis of the image of the license plate 308 to determine the license plate identification.

The image of the license plate 308 may undergo a primary analysis process 310, which may include a first OCR process 312 performed by the first OCR circuitry 210. In some implementations, the primary analysis process 310 includes a second OCR process 314 performed by the second OCR circuitry 212, while in some implementations the primary analysis process 310 also includes a fingerprinting process 316 performed by the fingerprinting circuitry 214. The first OCR process and the second OCR process may each determine a candidate license plate string. Here, due to the obstruction 309, the first OCR process 312 determines a different candidate license plate string ("SPA5876") from the second OCR process 314 ("SPA5076"). In this example, the first OCR process 312 was impacted by the obstruction 309 to determine the fifth character is an "8" instead of a "0." Further, the first OCR process 312 may determine that the confidence level associated with this license plate string (and thus a corresponding license plate identification) is relatively high as it thinks it clearly recognizes an "8." In a different manner, however, the second OCR process 314 may have provided the correct candidate license plate string or license plate identification, but it may have a decreased confidence level as the presence of the obstruction 309 may decrease its confidence in its recognition of the fifth character "0." Thus, in this instance, two different license plate strings (and two different license plate identifications) are determined based on the two different OCR processes 312 and 314.

Additionally, in one implementation, the fingerprinting process 316 can determine a fingerprint of the image of the license plate 308. As is shown at 316, the fingerprinting process 316 may examine multiple points of interest 317 to determine characteristics and distances therebetween to generate a fingerprint. The fingerprinting process 316 may then compare that determined fingerprint to other select stored fingerprints to determine a fingerprint candidate license plate and a fingerprint confidence level. The select stored fingerprints may be selected from all or some of the candidate license plate strings determined in the first OCR process 312 and the second OCR process 314 as well as the derivative candidate license plate strings determined by the derivative candidate license plate circuitry 215. In this example, we can assume the fingerprinting processes 316 determined that the image of the license plate 308 properly corresponded to the license plate identification "SPA5076." However, a fingerprint confidence level may be reduced due to the obstruction 309 impacting the analysis.

The various candidate license plate identifications may be provided to a secondary analysis process 318, which may include a rules-based analysis process 319 performed by the rules-based analysis circuitry 219, a behavioral analysis process 320 performed by the behavior analysis circuitry 220 (coupled to the historical toll database 228), or a vehicle attribute analysis processes 322 performed by the vehicle attribute analysis circuitry 226 (coupled to the vehicle attribute database 230). The secondary analysis process 318 may be carried out as discussed elsewhere herein, and may provide results and data to a probability evaluation process 324 performed by the probability evaluation circuitry 232. As is shown here, at the completion of the example IALPR process, the probability evaluation circuitry 232 outputs a determination of the correct license plate identification 326 for the toll event.

FIG. 4 shows an example specific system implementation 400 for the IALPR system 200. According to implementation 400, the system 200 includes system circuitry 402 to support implementation of the various circuitry elements, processes, and functionality discussed above with respect to FIGS. 2 and 3, and elsewhere herein. In one implementation, the system circuitry 402 includes processors 404, memory 406, or other circuitry. The processors 404 may be connected to the memory 406 and may comprise a memory system including a plurality of memory devices collocated or distributed across multiple systems. The memory 406 may store control instructions, operational parameters for the control instructions, datasets, and other information. The control instructions may be executed by the processor 404 to implement any of the processing described below, according to a configuration set by the operational parameters. Further, in some implementations, various circuitry elements of the system 200 may be implemented by the system circuitry 402. For example, toll point controller 204, the first OCR circuitry 210, the second OCR circuitry 212, the fingerprinting circuitry 214, the behavior analysis circuitry 220 (including the trip analysis circuitry 222 or the historical behavior analysis circuitry 224), the vehicle attribute analysis circuitry 226, the probability evaluation circuitry 232, the transaction processing circuitry 234, or the user interface circuitry 238 may be implemented in whole or in part by one or more instances of the system circuitry 402.

The memory 406 may store data and instructions for use by the circuitry elements or to implement portions of the circuitry elements. In one implementation, the memory 406 includes analysis rules 408, which may determine various thresholds or rules to follow during analysis of an image of a license plate (e.g., a rule such as always perform the secondary analysis process if the front and rear plate do not match). The memory 406 may also include first OCR process instructions 410 or second OCR process instructions 412. The processors 404, memory 406, and first or second OCR process instructions 410, 412 may implement portions of the first OCR circuitry 210 or second OCR circuitry 212, respectively, shown in FIG. 2. Similarly, the memory 406 may include fingerprinting process instructions 414, which, together with the processors 404 or other circuitry, may implement all or portions of the fingerprinting circuitry 214 shown in FIG. 2. Further, the memory 406 may include vehicle attribute analysis instructions 416, which, together with the processors 404 or other circuitry, may implement all or portions of the vehicle attribute analysis circuitry 226 shown in FIG. 2. Additionally, the memory 406 may include vehicle behavior analysis instructions 418, possibly also including therewith trip analysis instructions 420 or historical behavior analysis instructions 422, which, together with the processors 404 or other circuitry, may implement all or portions of the behavior analysis circuitry 220, the trip analysis circuitry 222, or the historical behavior analysis circuitry 224, respectively. The memory 406 may include probability evaluation instructions 424, which, together with the processors 404 or other circuitry, may implement all or portions of the probability evaluation circuitry 232. The memory 406 may also include statistical model data or instructions 426, thresholds 428, or other data associated with the probability evaluation process. Similarly, the memory 406 may also include user interface instructions 430, which may further include graphical user interface (GUI) instructions and data 432. The processors 404, memory 406, user interface instructions 430 and GUI instructions and data 432 may implement portions of the user interface circuitry 238 shown in FIG. 2. Additionally, the memory 406 may include transaction processing instructions 434, which, together with the processors 404 or other circuitry, may implement all or portions of the transaction processing circuitry 234 shown in FIG. 2. Other instructions or data may also be included in memory 406.

The system 200 may also include communication interfaces 436, which may support wireless communication via wireless communication circuitry 438 and antennas 440. Example wireless communication protocols may include Bluetooth, Wireless Fidelity (Wi-Fi), Wireless Local Area Network (WLAN), near field communication protocols, cellular protocols (2G, 3G, 4G, Long Term Evolution (LTE) Long Term Expansion Advanced (LTE-A)), or other wireless protocols. Also, communication interface 436 may include wired communication circuitry 442. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, or other networks and network protocols. The communication interfaces 436 may be connected or configured to connect to the networks 444, including the Internet or an intranet, to enable the system 200 and the system circuitry 402 therein to communicate with other systems and devices. Additionally, the communication interface 436 includes system busses 446 to effect intercommunication between various elements, components, and circuitry portions of the system 200. Example system bus implementations include Peripheral Component Interconnect Express (PCIe), Serial or Parallel Advanced Technology Attachment (SATA or PATA), and integrated drive electronics (IDE) based buses.

The communication interfaces 436 may enable interconnection of various circuitry components illustrated in FIG. 2 within the system 200. For example, the communication interfaces 436 may couple to and interconnect the toll point controller 204, the primary analysis circuitry 208, the secondary analysis circuitry 218, the probability evaluation circuitry 232, the user interface circuitry 238, or the transaction processing circuitry 234. Further, the communication interfaces 436 may couple and interconnect the various databases and other peripheral devices show in FIG. 2 internally via system busses 446 if internally maintained, or externally via the wireless communication circuitry 438 or the wired communication circuitry 442 if externally maintained. The communication interfaces 436 may also support communication with remote storage databases 448, which may implement any or all of the databases shown in FIG. 2. Further, the communication interfaces 436 may support communication between remote circuitry elements, for example, if different circuitry elements (e.g., the first OCR circuitry 210 and the behavior analysis circuitry 220) are instantiated on separate or remote system circuitry (e.g., on separate servers connected by a network 444). For example, the communication interfaces 436 may enable various back office portions of the system to communicate with toll point controller 120 or other equipment associated with a toll collection point 104.

The communication interfaces 436 may support communication with external client devices 450. Communication with the external client devices 450 may be effected through user interface circuitry 238 or with user interface instructions 430. A dynamically reconfigurable GUI may be provided to the external client devices 450 via the networks 444 to enable interaction between the client devices 450 and the system 400. For example, the client devices 450 may be used during a human review process to enable external identification of license plates in images for toll events.

In some implementations, the system 200 may itself include various I/O interfaces 452 or a display 454, for example, to enable local interaction with the various circuitry elements discussed above instead of or in addition to interaction over the networks 444 with a remote client device 450. In some examples, the display 454 can provide a user interface 456 to a local user, which can be the same as or a variation of a user interface that can be provided to a remote client device 450 (discussed below).

Additionally, the I/O interfaces 452 and display 454 may enable local maintenance engineers to interact with the system 200. A local GUI may be provided via the local display 454 to present a control dashboard, actionable insights or other information to a maintenance engineer. The local GUI may support portable access, such as, via a web-based GUI, to enable maintenance on the system 200 or other interaction with the system 200. This local GUI may be the same as or different from the GUI described elsewhere. The system 200 may also include a storage drive 458 (e.g., a hard drive, solid-state drive, or other memory system) to enable local storage of system software, user interfaces, or system instructions. The storage drive 458 may also implement any or all of the databases shown on FIG. 2.

Figure 5:
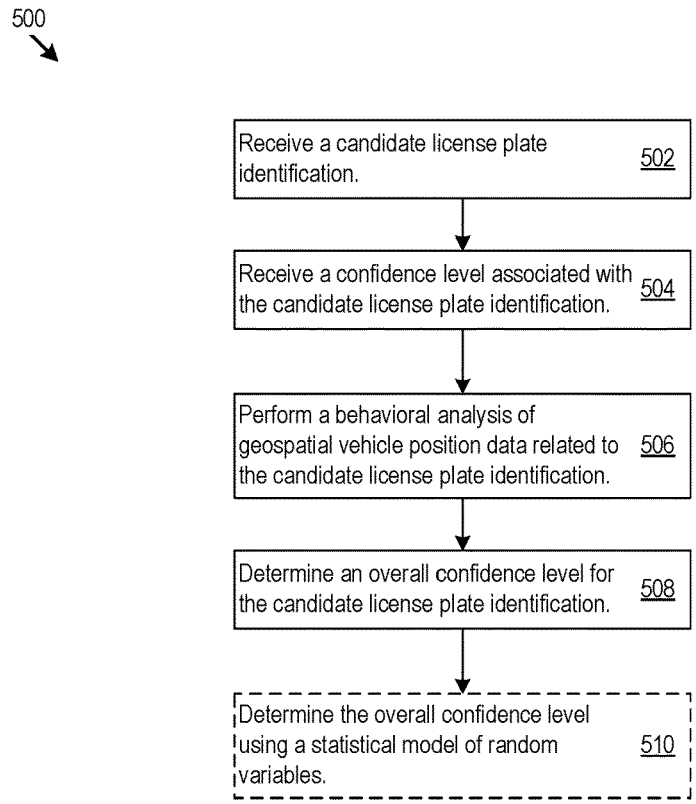
FIG. 5 shows an example flow diagram of logic that the system may implement.

FIG. 5 shows a flow diagram of logic 500 that the system 200 may implement as part of a process to determine a license plate identification for a toll event. For instance, the behavior analysis circuitry 220 or the probability evaluation circuitry 232 may be configured to implement some or all of the logic 500 shown in FIG. 5. The behavior analysis circuitry 220 or the probability evaluation circuitry 232 may receive a candidate license plate identification associated with an image of a vehicle proximate to a current toll collection point during a current toll event (502) or an identification confidence level associated with the candidate license plate identification (504). The candidate license plate identification and associated identification confidence level may be received via a communication interface 436 from one or more circuitry elements of the primary analysis circuitry 208. The behavior analysis circuitry 232 may perform a behavioral analysis process on the candidate license plate identification to generate behavioral information (506). The behavioral analysis process may include performing a behavioral analysis of geospatial vehicle position data related to the candidate license plate identification. The probability evaluation circuitry 232 may then determine an overall confidence level associated with the candidate license plate identification responsive to (e.g., based on) the candidate license plate identification, the identification confidence level, and the behavioral information (508). The probability evaluation circuitry 232 may make this determination (508) using a statistical model of random variables 233 (510).

Figure 6:
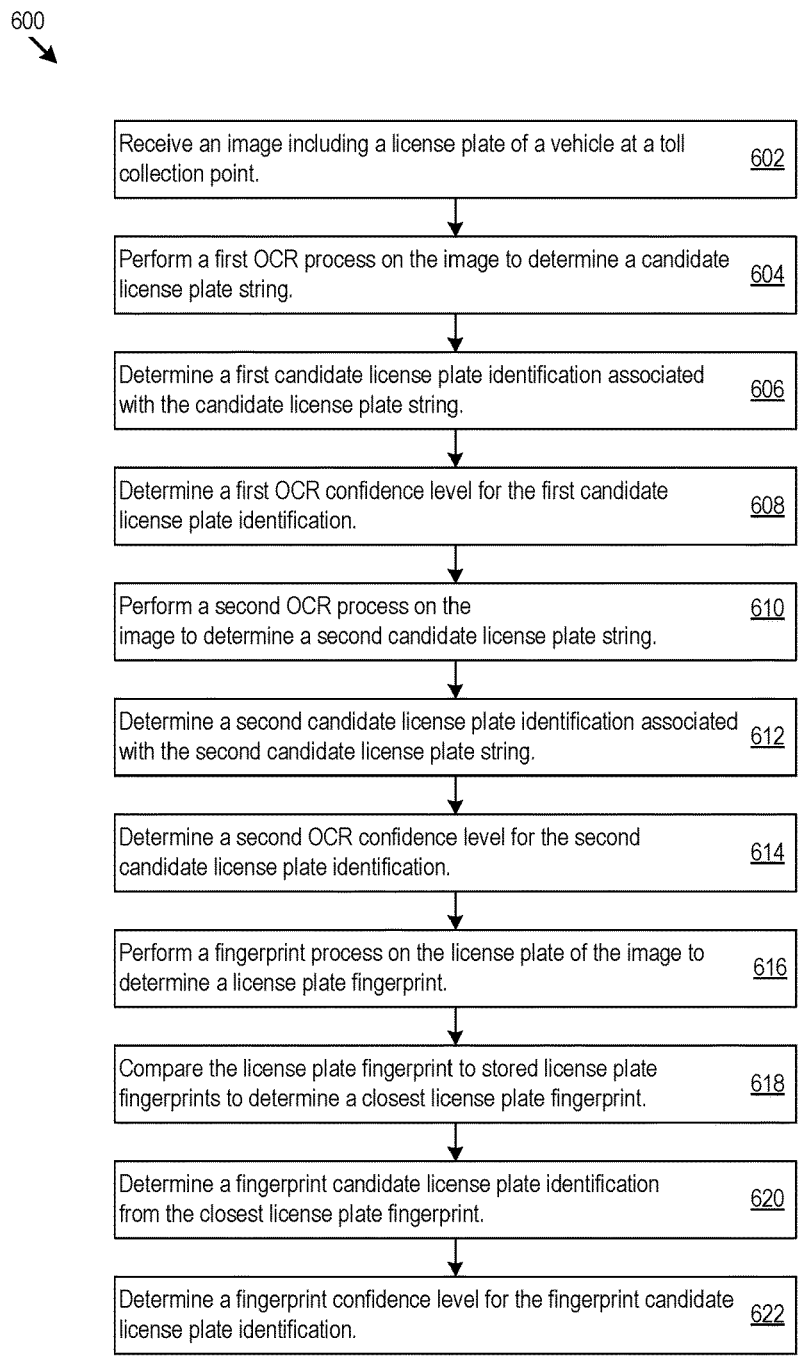
FIG. 6 shows another flow diagram of logic that the system may implement.

FIG. 6 shows another flow diagram of logic 600 that the system 200 may implement as part of a process to determine a license plate identification for a toll event. For instance, the first OCR circuitry 210, the second OCR circuitry, or the fingerprinting circuitry 214 may be configured to implement some or all of the logic 600 shown in FIG. 6. The first OCR circuitry 210, for example, may receive an image including a license plate of a vehicle proximate to a current toll collection point (602). The first OCR circuitry 210 may perform a first OCR process on the image to determine a candidate license plate string (604), determine a candidate license plate identification associated with the candidate license plate string (606), and determine a first OCR confidence level for the candidate license plate identification based on the first OCR process (608). Similarly, the second OCR circuitry 212 may also receive the image and may perform a second OCR process on the image to determine a second candidate license plate string (610), determine a second candidate license plate identification associated with the second candidate license plate string (612), and determine a second OCR confidence level for the second candidate license plate identification based on the second OCR process (614). In various implementations, the second OCR process is different from the first OCR process. In such an implementation, the step of determining the overall confidence level (508) may include the probability evaluation circuitry 232 determining the overall confidence level for the candidate license plate identification responsive to the first OCR confidence level, the second OCR confidence level, or other generated data.

Similarly, fingerprinting circuitry 214, as implemented on processor 404 or another processor, may also receive the image and may perform a fingerprint process on the license plate of the image to determine a current license plate fingerprint of the license plate of the vehicle (616). The fingerprinting circuitry 214 may then compare the current license plate fingerprint to stored license plate fingerprints to determine a closest license plate fingerprint to the current license plate fingerprint of the license plate of the vehicle (618). The fingerprinting circuitry 214 may then determine a fingerprint candidate license plate identification responsive to (e.g., matching) the closest license plate fingerprint (620) and determine a fingerprint confidence level for the fingerprint candidate license plate identification responsive to the closest license plate fingerprint (622). In this implementation, the step of determining the overall confidence level (508) may include the probability evaluation circuitry 232 determining the overall confidence level for the candidate license plate identification responsive to the first or second OCR confidence level, the fingerprint candidate license plate identification, the fingerprint confidence level, or other generated data.

Figure 7:
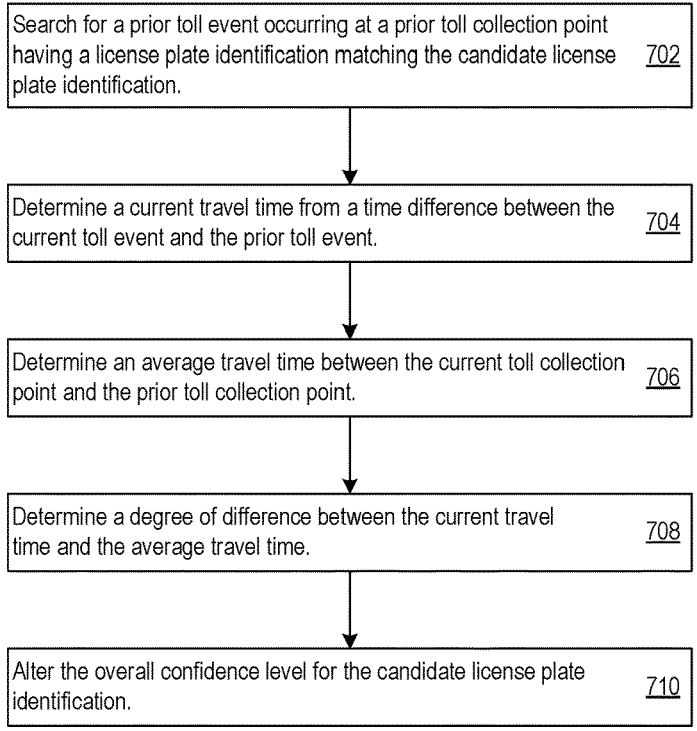
FIG. 7 shows another flow diagram of logic that the system may implement.

FIG. 7 shows another flow diagram of logic 700 that the system 200 may implement as part of a process to perform the behavioral analysis (506) or determine an overall confidence level for a candidate license plate identification (508) as shown in FIG. 5. In this implementation, performing the behavioral analysis includes performing a trip context analysis. For instance, the trip analysis circuitry 222 or the probability evaluation circuitry 232 may be configured to implement some or all of the logic 700 shown in FIG. 7. The trip analysis circuitry 222 may search for a related toll event occurring at a related toll collection point with respect to the current toll collection point and having a license plate identification matching the candidate license plate identification (702). For example, the searching may be performed on the historical toll database 228. The trip analysis circuitry 222 may determine a current travel time from a time difference between the current toll event and the related toll event (704). Further, the trip analysis circuitry 222 may determine an average travel time between the current toll collection point and the related toll collection point (706), and determine a degree of difference between the current travel time and the average travel time (708).

As part of step 508 in FIG. 5, the probability evaluation circuitry 232 or the trip analysis circuitry 222 may alter the overall confidence level for the candidate license plate identification responsive to the trip analysis circuitry 222 finding the related toll event (e.g., in the historical toll database) and responsive to determining the degree of difference between the current travel time and the average travel time (710). For example, the smaller the degree of difference is (e.g., indicating the closer the current travel time is to the average travel time), the higher the probability evaluation circuitry 232 can alter the overall confidence level for the candidate license plate identification. If no related toll event is found, then the overall confidence level may be reduced or remain unaltered.

Alternatively, the probability evaluation circuitry 232 or the trip analysis circuitry 222 may increase the overall confidence level for the candidate license plate identification when the related toll event is found and when the related toll event occurred within a travel time range based on an average travel time between the current toll collection point and the related toll collection point. Such a travel time range may represent an average travel time range that is a percentage or amount shorter than the average travel time (e.g., to account for faster or more aggressive drivers) up to a percentage or amount longer than the average travel time (e.g., to account for slower drivers or to account for stops that may be taken along the route, for example, at a rest area or a service station). Many different discrete travel time ranges may be determined, each with differing amounts by which the overall probability may be altered or affected.

Figure 8:
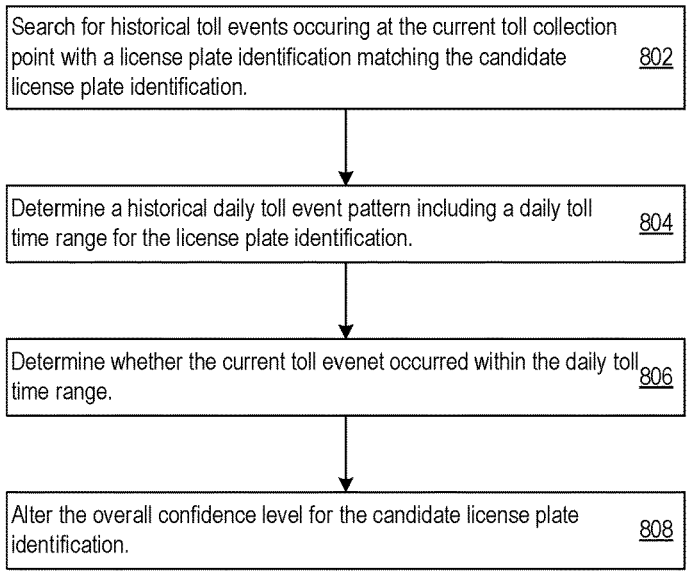
FIG. 8 shows another flow diagram of logic that the system may implement.

FIG. 8 shows another flow diagram of logic 800 that the system 200 may implement as part of a process to perform the behavioral analysis (506) or determine an overall confidence level for a candidate license plate identification (508) as shown in FIG. 5. In this implementation, performing the behavioral analysis includes performing a historical behavioral analysis. For instance, the historical behavior analysis circuitry 224 or the probability evaluation circuitry 232 may be configured to implement some or all of the logic 800 shown in FIG. 8. The historical behavior analysis circuitry 224 may search for historical toll events occurring at the current toll collection point with a license plate identification matching the candidate license plate identification (802). The historical behavior analysis circuitry 224 may then determine a historical daily toll event pattern for the license plate identification responsive to (e.g., based on) the plurality of historical toll events (804) and determine whether a toll event corresponding to the image occurred within a daily toll time range of the historical daily toll event pattern for the license plate identification (806). The probability evaluation circuitry 232 or the historical behavior analysis circuitry 224 may then increase or otherwise alter the overall confidence level for the candidate license plate identification when the toll event corresponding to the image occurred within the daily toll time range (808).

Figure 9:
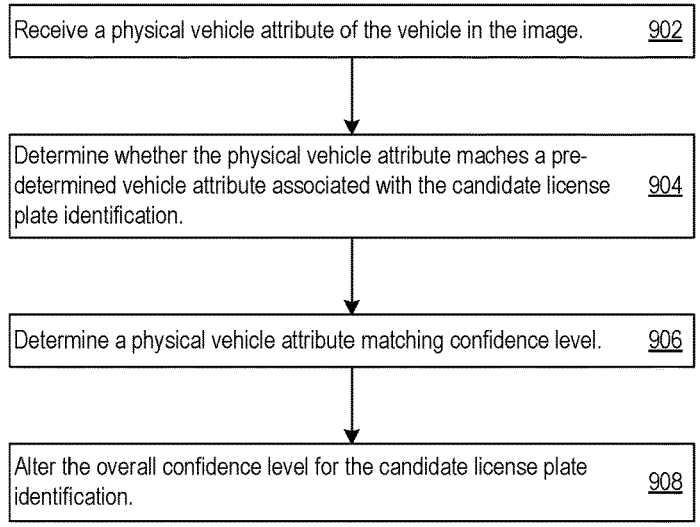
FIG. 9 shows another flow diagram of logic that the system may implement.

FIG. 9 shows another flow diagram of logic 900 that the system 200 may implement as part of a process to perform the behavioral analysis (506) or determine an overall confidence level for a candidate license plate identification (508) as shown in FIG. 5. For instance, the vehicle attribute analysis circuitry 226 or the probability evaluation circuitry 232 may be configured to implement some or all of the logic 900 shown in FIG. 9. The vehicle attribute analysis circuitry 226 may receive a physical vehicle attribute of a vehicle in an image of the vehicle proximate to a current toll collection point (902). Alternatively, the vehicle attribute analysis circuitry 226 may receive the image and determine a physical vehicle attribute of the vehicle in the image. The physical vehicle attribute or the image may be received via the communication interface 436. The vehicle attribute analysis circuitry 226 may determine whether the physical vehicle attribute matches a pre-determined vehicle attribute associated with the candidate license plate identification (904). This may entail comparing the physical vehicle attribute to the pre-determined vehicle attribute associated with the candidate license plate identification. The vehicle attribute analysis circuitry 226 may determine a physical vehicle attribute matching confidence level (906). The probability evaluation circuitry 232 or the vehicle attribute analysis circuitry 226 may alter the overall confidence level for the candidate license plate identification responsive to (e.g., dependent on) determining that the physical vehicle attribute matches the pre-determined vehicle attribute and responsive to determining the physical vehicle attribute matching confidence level (908). For example, the overall confidence level for the candidate license plate identification may be increased when the physical vehicle attribute matches the pre-determined vehicle attribute.

Figure 10:
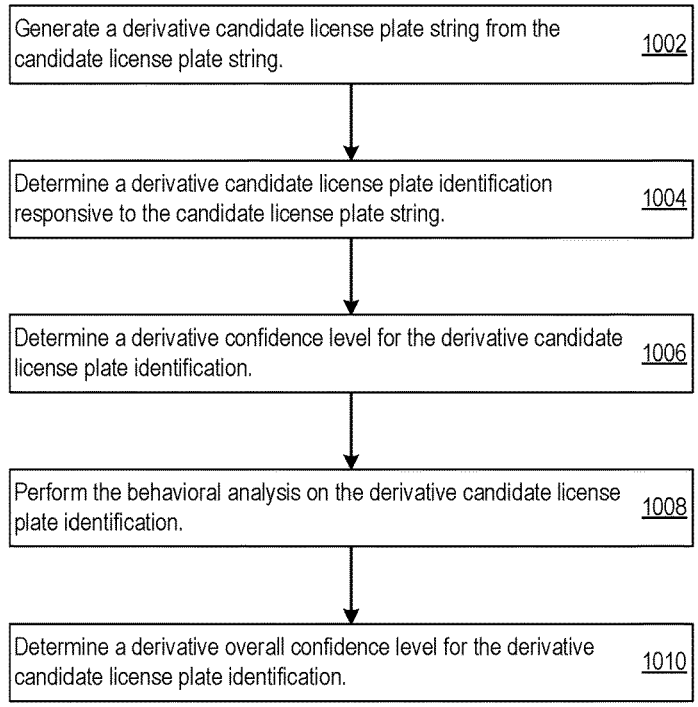
FIG. 10 shows another flow diagram of logic that the system may implement.

FIG. 10 shows another flow diagram of logic 1000 that the system 200 may implement as part of a process to determine a license plate identification for a toll event. For instance, the first or second OCR circuitry 210, 212 or the probability evaluation circuitry 232 may be configured to implement some or all of the logic 1000 shown in FIG. 10. The first or second OCR circuitry 210, 212 may generate a derivative candidate license plate string(s) from the candidate license plate string (1002). The derivative candidate license plate string may be a string that is close to or similar in appearance to the original candidate license plate string. An example of similar license plate strings is shown in FIG. 3 where the two license plate strings ("SPA5876" and "SPA5076") are similar. In one example, the second string ("SPA5076") may be a derivative of an original candidate license plate string ("SPA5876"). In various implementations, the first or second OCR circuitry 210, 212, or another circuitry element, may evaluate the reading probability or confidence level with every individual character and generate alternative license plate strings. In some implementations, the first or second OCR circuitry 210, 212 may use grammatical inference algorithms based on the concepts of Hamming or Levenshtein distances to generate derivative candidate license plate strings.

The first or second OCR circuitry 210, 212 may then determine a derivative candidate license plate identification(s) responsive to (e.g., matching) the derivative candidate license plate string(s) (1004). The first or second OCR circuitry 210, 212 may also determine a derivative confidence level for the derivative candidate license plate identification(s) (1006). The process of determining the derivative confidence levels may be similar to the process of determining the OCR confidence levels in steps 608 or 614. The behavior analysis circuitry 220 can subsequently perform behavioral analysis on the derivative candidate license plate identification(s) (1008), which may be the same processes as are performed on the original candidate license plate identifications as in step 506. The behavior analysis circuitry 220 or the probability evaluation circuitry 232 may then determine a derivative overall confidence level(s) for the derivative candidate license plate identification(s) responsive to the derivative confidence level and the behavioral analysis (1010), which may be the same processes as are performed on the original candidate license plate identifications as in step 508.

Once overall confidence levels are determined for the original candidate license plate identifications and the derivative candidate license plate identifications, the probability evaluation circuitry 232 can determine the proper license plate identification for the toll event according to which license plate identification has the highest associated overall confidence level. For example, if two different license plates have similarly high overall confidence levels associated therewith, then the toll event and the associated data may be sent to the user interface circuitry 238 to implement human review of the image of the vehicle at the toll collection point during the toll event.

Figure 11:
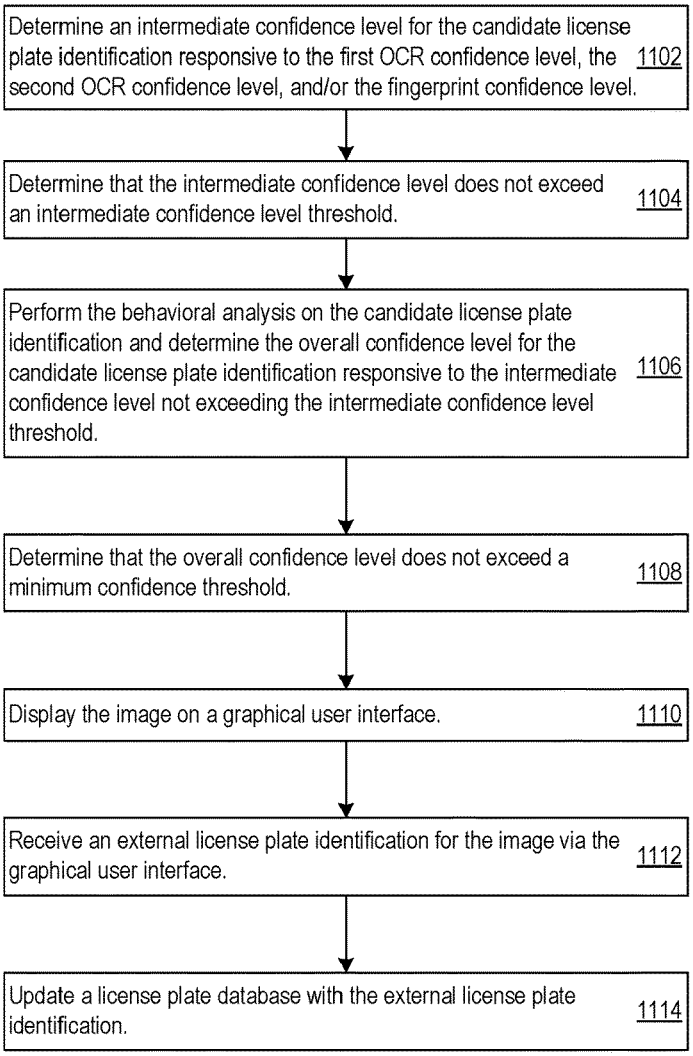
FIG. 11 shows another flow diagram of logic that the system may implement.

FIG. 11 shows another flow diagram of logic 1100 that the system 200 may implement as part of a process to determine a license plate identification for a toll event. For instance, the probability evaluation circuitry 232 may be configured to implement some or all of the logic 1100 shown in FIG. 11. The probability evaluation circuitry 232 may determine an intermediate confidence level for the candidate license plate identification responsive to the first OCR confidence level, the second OCR confidence level, or the fingerprint confidence level (1102). The probability evaluation circuitry 232 may also determine that the intermediate confidence level exceeds an intermediate confidence level threshold (1104). If the intermediate confidence level exceeds the intermediate confidence level threshold, the probability evaluation circuitry 232 may forgo secondary analysis by the various circuitry elements of the secondary analysis circuitry 218. Alternatively, if the intermediate confidence level does not exceed the intermediate confidence level threshold, the probability evaluation circuitry 232 may then effect performance of the behavioral analysis on the candidate license plate identification and determine the overall confidence level for the candidate license plate identification responsive to (e.g., based on) the first or second OCR confidence level, the fingerprint candidate license plate identification, and the fingerprint confidence level, the behavioral analysis information, or the attribute matching information (1106).

After determining the overall confidence level for a candidate license plate identification, the probability evaluation circuitry 232 may determine that the overall confidence level does not exceed a minimum confidence threshold (1108). If so, the probability evaluation circuitry 232 may effect the user interface circuitry 238 to display the image at the toll collection point on a GUI in communication with the processor 404 (1110). For example, the GUI may be provided on a client device 450 to effect human review of the image to determine the correct license plate identification for the vehicle at the toll collection point. The probability evaluation circuitry 232 may receive from the GUI an external license plate identification for the image (1112). The external license plate identification may be a user-typed license plate string for the license plate, or may be an indication that a previously determined candidate license plate identification was correct or incorrect. The probability evaluation circuitry 232 or other circuitry elements may then update a license plate database (e.g., knowledge database 236, vehicle attribute database 230, historical toll database 228, or fingerprint database 216) with the external license plate identification (1114), as discussed above. The updated data can later be used to retrain various models or provide more accurate confidence levels associated with candidate license plate identifications.

Figure 12:
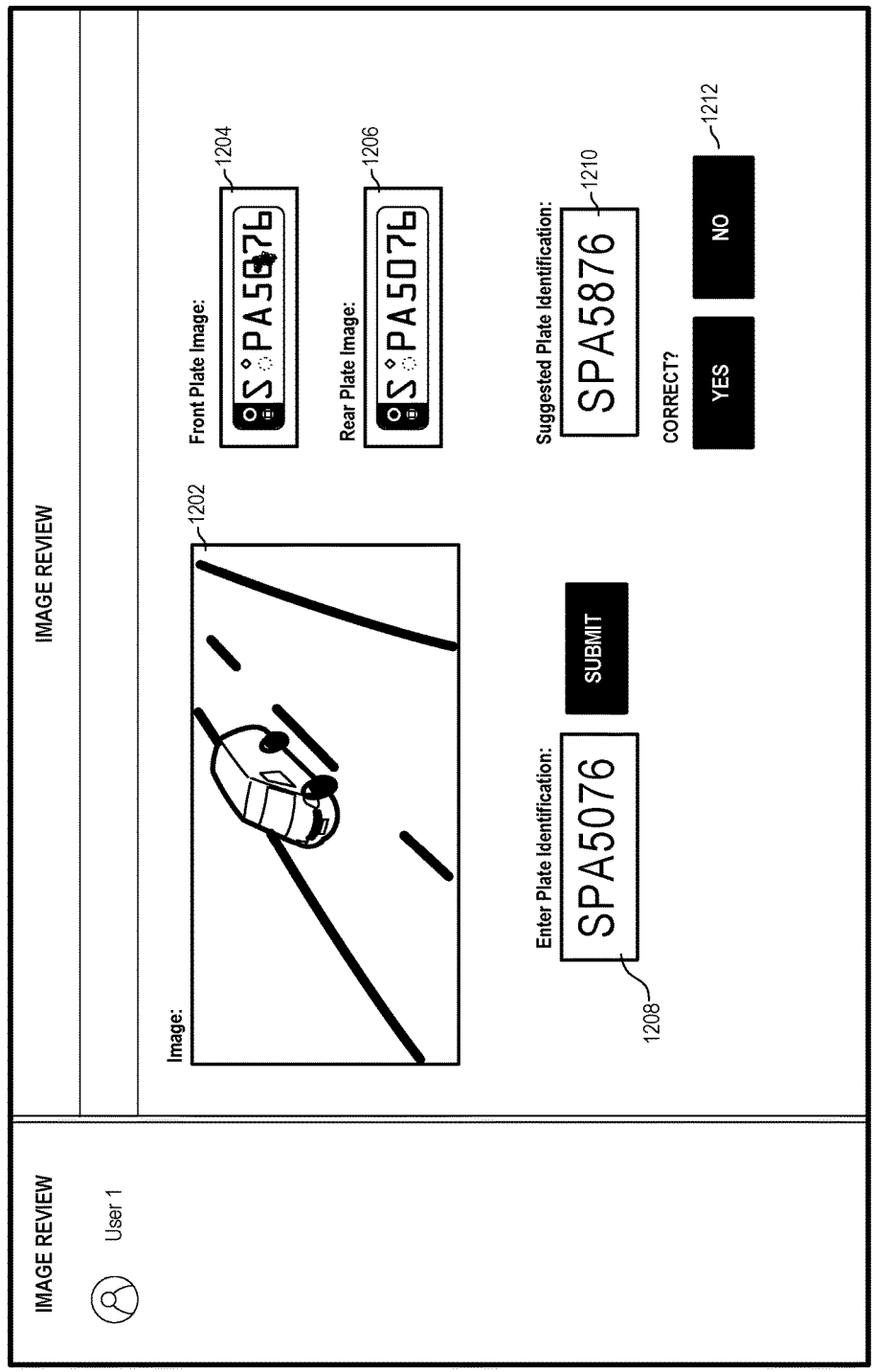
FIG. 12 shows an example graphical user interface as may be provided by the system of FIG. 2.

FIG. 12 illustrates an example graphic user interface (GUI) 1200 that the user interface circuitry 238 may generate and provide to a user at a client device 450. The GUI 1200 implements an improved machine interface for reviewing images and license plates associated with vehicles at toll collection points during a toll event. The GUI 1200 may present an image 1202 of the vehicle at the toll collection point, and may also provide extracted image portions corresponding to the front license plate 1204 or the rear license plate 1206. The GUI 1200 may provide the user with an ability to provide an external license plate identification. For example, the GUI 1200 may provide a prompt 1208 for the user to type in or otherwise enter a license plate identification associated with the license plate in the image 1202. Additionally or alternatively, the GUI 1200 may provide one or more determined candidate license plate identifications 1210 with a response input 1212 to indicate whether one of the candidate license plate identifications are the correct license plate for the vehicle in the image 1202. Many variations are possible.

So configured, an IALPR system 200 is provided such that multiple layers of license plate recognition processes can be utilized. Behavior analysis circuitry and vehicle attribute analysis circuitry may be used to take into account data or aspects not previously utilized in IALPR processes. Probability evaluation circuitry evaluates and analyzes the various outputs from those processes together to determine the correct identification of a license plate in the image. As a result, the overall confidence level for a determination of a license plate identification is improved, thereby reducing the need for expensive human review and reducing the occurrence of incorrect toll assessment due to incorrect license plate identification.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in one or more non-transitory computer-readable mediums that may include a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings. The computer-readable medium may include instructions that, when executed by circuitry elements, cause the circuitry elements to perform a method including one or more steps discussed in this disclosure.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method comprising:
   receiving, at a processor, an image including a representation of a license plate of a vehicle when the vehicle is proximate to a current toll collection point;
   performing, by the processor, a first optical character recognition (OCR) process on the image to determine a candidate license plate string;
   determining, by the processor, a candidate license plate identification associated with the candidate license plate string;
   determining, by the processor, an OCR confidence level for the candidate license plate identification based on the first OCR process;
   performing, by the processor, a behavioral analysis of geospatial vehicle position data related to the candidate license plate identification;
   generating, by the processor, a behavioral analysis result based on the analysis of the geospatial vehicle position data;
   determining, by the processor, an overall confidence level for the candidate license plate identification responsive to the OCR confidence level and the behavioral analysis result;
   comparing the overall confidence level to a minimum confidence threshold; and
   if the determined overall confidence level is above the minimum confidence threshold, communicating the candidate license plate information as a correctly identified license plate identification to a transaction processing system to thereby facilitate billing and collection of a toll associated with the current toll collection point.

2. The method of claim 1, where:
   performing the behavioral analysis comprises performing a trip context analysis, the trip context analysis comprising:
      searching for a related toll event occurring at a related toll collection point, the related toll collection point with respect to the current toll collection point, and having a license plate identification matching the candidate license plate identification; and
      increasing the overall confidence level for the candidate license plate identification when:
         the related toll event is found, and
         the related toll event occurred within a travel time range,
            the travel time range based on an average travel time between the current toll collection point and the related toll collection point.

3. The method of claim 1 where:
   performing the behavioral analysis comprises performing a historical behavioral analysis, the historical behavioral analysis comprising:
      searching for historical toll events occurring at the current toll collection point, the historical toll events associated with a license plate identification matching the candidate license plate identification;
      determining, by the processor, a historical daily toll event pattern associated with the license plate identification, the determining responsive to the historical toll events;
      determining, by the processor, whether a toll event corresponding to the image occurred within a daily toll time range of the historical daily toll event pattern for the license plate identification; and
      increasing the overall confidence level for the candidate license plate identification when the toll event corresponding to the image occurred within the daily toll time range.

4. The method of claim 1 further comprising:
   determining, by the processor, a physical vehicle attribute of the vehicle in the image;

comparing, by the processor, the physical vehicle attribute to a pre-determined vehicle attribute associated with the candidate license plate identification; and increasing the overall confidence level for the candidate license plate identification when the physical vehicle attribute matches the pre-determined vehicle attribute.

5. The method of claim 1 further comprising determining the overall confidence level using a statistical model of random variables.

6. The method of claim 1 further comprising:

performing, by the processor, a second OCR process on the image to determine a second candidate license plate string, the second OCR process different from the first OCR process;

determining, by the processor, a second candidate license plate identification associated with the second candidate license plate string;

determining, by the processor, a second OCR confidence level for the second candidate license plate identification based on the second OCR process; and determining, by the processor, the overall confidence level for the candidate license plate identification based on the OCR confidence level and the second OCR confidence level.

7. The method of claim 1 further comprising:

performing, by the processor, a fingerprint process on the license plate of the image to determine a current license plate fingerprint;

comparing, by the processor, the current license plate fingerprint to stored license plate fingerprints;

determining, by the processor, a closest license plate fingerprint to the current license plate fingerprint, the determining responsive to the comparing;

determining, by the processor, a fingerprint candidate license plate identification, the fingerprint candidate license plate identification responsive to the closest license plate fingerprint; and determining, by the processor, a fingerprint confidence level for the fingerprint candidate license plate identification responsive to the closest license plate fingerprint.

8. The method of claim 7 further comprising:

determining an intermediate confidence level for the candidate license plate identification, the determining responsive to the OCR confidence level and the fingerprint confidence level; and determining, by the processor, that the intermediate confidence level does not exceed an intermediate confidence level threshold.

9. The method of claim 1, wherein if the determined overall confidence level does not exceed the minimum confidence threshold, the method further comprises:

displaying the image at the toll collection point on a graphical user interface in communication with the processor;

receiving, from the graphical user interface, an external license plate identification for the image; and updating a license plate database with the external license plate identification.

10. The method of claim 1 further comprising:

generating, by the processor, a derivative candidate license plate string from the candidate license plate string;

determining, by the processor, a derivative candidate license plate identification responsive to the derivative candidate license plate string;

determining, by the processor, a derivative confidence level for the derivative candidate license plate identification;

performing, by the processor, the behavioral analysis on the derivative candidate license plate identification; and determining, by the processor, a derivative overall confidence level for the derivative candidate license plate identification responsive to the derivative confidence level and the behavioral analysis.

11. A system comprising:

a communication interface configured to receive:

a candidate license plate identification associated with an image of a vehicle proximate to a current toll collection point during a current toll event, and an identification confidence level associated with the candidate license plate identification;

behavioral analysis circuitry coupled to the communication interface, the behavioral analysis circuitry configured to:

perform a behavioral analysis of geospatial vehicle positioning data related to the candidate license plate identification to generate behavioral information;

search for a related toll event occurring at a related toll collection point with respect to the current toll collection point and having a license plate identification matching the candidate license plate identification;

determine a current travel time from a time difference between the current toll event and the related toll event;

determine an average travel time between the current toll collection point and the related toll collection point; and determine a degree of difference between the current travel time and the average travel time; and probability evaluation circuitry configured to:

determine an overall confidence level associated with the candidate license plate identification responsive to the candidate license plate identification, the identification confidence level, and the behavioral information;

compare the overall confidence level to a minimum confidence threshold; and if the determined overall confidence level is above the minimum confidence threshold, control the communication interface to communicate the candidate license plate information as a correctly identified license plate identification to a transaction processing system to thereby facilitate billing and collection of a toll associated with the current toll collection point.

12. The system of claim 11 wherein the probability evaluation circuitry further comprises a statistical model of random variables.

13. The system of claim 11 wherein the behavioral analysis circuitry is further configured to:

search for historical toll events occurring at the current toll collection point with a license plate identification matching the candidate license plate identification;

determine a historical daily toll event pattern including a daily toll time range for the license plate identification responsive to the historical toll events; and determine whether the current toll event occurred within the daily toll time range.

14. The system of claim 11 wherein the communication interface is further configured to receive a physical vehicle attribute of the vehicle in the image;

the system further comprising vehicle attribute analysis circuitry configured to:
  determine whether the physical vehicle attribute matches a pre-determined vehicle attribute associated with a license plate identification matching the candidate license plate identification; and
  determine a physical vehicle attribute matching confidence level; and
the probability evaluation circuitry further configured to alter the overall confidence level for the candidate license plate identification responsive to determining that the physical vehicle attribute matches the pre-determined vehicle attribute and responsive to the physical vehicle attribute matching confidence level.

15. A non-transitory computer-readable medium including instructions that, when executed by circuitry elements, cause the circuitry elements to perform a method comprising:
  receiving, via a communication interface, a candidate license plate identification associated with an image of a vehicle proximate to a current toll collection point during a current toll event and an identification confidence level associated with the candidate license plate identification;
  performing, by behavioral analysis circuitry coupled to the communication interface, a behavioral analysis process on the candidate license plate identification to generate behavioral information;
  determining, by probability evaluation circuitry coupled to the behavioral analysis circuitry, an overall confidence level associated with the candidate license plate identification responsive to the candidate license plate identification, the identification confidence level, and the behavioral information;
  searching, by the behavioral analysis circuitry, for historical toll events occurring at the current toll collection point with a license plate identification matching the candidate license plate identification;
  determining, by the behavioral analysis circuitry, a historical daily toll event pattern including a daily toll time range for the license plate identification responsive to the historical toll events;
  determining, by the behavioral analysis circuitry, whether the current toll event occurred within the daily toll time range;
  altering, by the probability evaluation circuitry, the overall confidence level for the candidate license plate identification responsive to determining whether the current toll event occurred within the daily toll time range;
  comparing the overall confidence level to a minimum confidence threshold; and
  if the determined overall confidence level is above the minimum confidence threshold, communicating the candidate license plate information as a correctly identified license plate identification to a transaction processing system to thereby facilitate billing and collection of a toll associated with the current toll collection point.

16. The computer-readable medium of claim 15, wherein the method further comprises determining, by the probability evaluation circuitry, the overall confidence level associated with the candidate license plate identification using a statistical model of random variables.

17. The computer-readable medium of claim 15, wherein the method further comprises:
  searching, by the behavioral analysis circuitry, for a related toll event occurring at a related toll collection point with respect to the current toll collection point and having a license plate identification matching the candidate license plate identification;
  determining, by the behavioral analysis circuitry, a current travel time from a time difference between the current toll event and the related toll event;
  determining, by the behavioral analysis circuitry, an average travel time between the current toll collection point and the related toll collection point;
  determining, by the behavioral analysis circuitry, a degree of difference between the current travel time and the average travel time; and
  altering, by the probability evaluation circuitry, the overall confidence level for the candidate license plate identification responsive to finding the related toll event and responsive to determining the degree of difference between the current travel time and the average travel time.

18. The computer-readable medium of claim 15, wherein the method further comprises:
  receiving, by the communication interface, a physical vehicle attribute of the vehicle in the image;
  determining, by vehicle attribute analysis circuitry, whether the physical vehicle attribute matches a pre-determined vehicle attribute associated with the candidate license plate identification;
  determining, by the vehicle attribute analysis circuitry, a physical vehicle attribute matching confidence level; and
  altering, by the probability evaluation circuitry, the overall confidence level for the candidate license plate identification responsive to determining that the physical vehicle attribute matches the pre-determined vehicle attribute and responsive to determining the physical vehicle attribute matching confidence level.

19. A system comprising:
  a communication interface configured to receive:
    a candidate license plate identification associated with an image of a vehicle proximate to a current toll collection point during a current toll event;
    an identification confidence level associated with the candidate license plate identification; and
    a physical vehicle attribute of the vehicle in the image;
  vehicle attribute analysis circuitry configured to:
    determine whether the physical vehicle attribute matches a pre-determined vehicle attribute associated with a license plate identification matching the candidate license plate identification; and
    determine a physical vehicle attribute matching confidence level; and
  behavioral analysis circuitry coupled to the communication interface, the behavioral analysis circuitry configured to:
    perform a behavioral analysis of geospatial vehicle positioning data related to the candidate license plate identification to generate behavioral information;
  probability evaluation circuitry configured to:
    determine an overall confidence level associated with the candidate license plate identification responsive to the candidate license plate identification, the identification confidence level, and the behavioral information;
    alter the overall confidence level for the candidate license plate identification responsive to determining that the physical vehicle attribute matches the predetermined vehicle attribute and responsive to the physical vehicle attribute matching confidence level;

compare the overall confidence level to a minimum confidence threshold; and if the determined overall confidence level is above the minimum confidence threshold, control the communication interface to communicate the candidate license plate information as a correctly identified license plate identification to a transaction processing system to thereby facilitate billing and collection of a toll associated with the current toll collection point.

* * * * *